United States Patent
Honda et al.

(10) Patent No.: US 7,373,474 B2
(45) Date of Patent: May 13, 2008

(54) STORAGE SYSTEM, CONFIGURATION MANAGEMENT METHOD, AND PROGRAM

(75) Inventors: Yoshihisa Honda, Odawara (JP); Yoshihito Nakagawa, Ooi (JP); Keishi Tamura, Odawara (JP); Itaru Isobe, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 290 days.

(21) Appl. No.: 11/144,670

(22) Filed: Jun. 6, 2005

(65) Prior Publication Data
US 2006/0230248 A1 Oct. 12, 2006

(30) Foreign Application Priority Data
Apr. 6, 2005 (JP) .............................. 2005-110246

(51) Int. Cl.
G06F 13/00 (2006.01)
G06F 12/00 (2006.01)

(52) U.S. Cl. ..................... 711/170; 710/316; 710/200; 711/111

(58) Field of Classification Search ..................... None
See application file for complete search history.

(56) References Cited

U.S. PATENT DOCUMENTS 6,839,740 B1 * 1/2005 Kiselev ..................... 709/214
7,120,709 B2 * 10/2006 Isobe et al. ................ 710/38
2006/0117072 A1 * 6/2006 McKenney et al. ......... 707/201
2006/0206677 A1 * 9/2006 Kim et al. .................. 711/162

FOREIGN PATENT DOCUMENTS

JP 2004-145901 * 5/2004

* cited by examiner

*Primary Examiner*—Denise Tran
(74) *Attorney, Agent, or Firm*—Antonelli, Terry, Stout & Kraus, LLP.

(57) ABSTRACT

Techniques for realizing efficient setting and utilization of configuration including storage volumes in a storage system having an initiator and a target, with a low cost configuration not requiring additional equipment such as a LAN and a server without limitations due to a low-transfer rate network are provided. The storage system has, e.g., an IS serving as an initiator, a TS serving as a target, and a frame relay device R for relaying the communication between the devices. The R has a DB for retaining the configuration information including the configuration of storage volumes in plural devices connected via plural ports, and an exclusive control unit for performing an exclusive control process of the configuration information in the DB upon setting for utilizing the storage volumes among the plural devices. According to update of the configuration of each device, the R updates the configuration information in the DB.

6 Claims, 15 Drawing Sheets

FIG. 5A

| STORAGE INFORMATION MANAGEMENT TABLE | | | | | | | | | | | | | |
|---|---|---|---|---|---|---|---|---|---|---|---|---|---|
| TARGET DEVICE (STORAGE DEVICE) | | | | | | | | INITIATOR DEVICE (STORAGE DEVICE/HOST) | | | | | |
| VENDOR NAME (PRODUCT NAME | | IDENTIFIER | | | | | | VENDOR NAME (PRODUCT NAME | | | | | |
| | | S/N | WWN | LUN | | IOPS | STATE | | | S/N | WWN | LUN | SHARE |
| C | C | 63521 | 1 | 1 | 1 | 20 | UP-DATING | A | A | 65535 | 5 | 1 | 0 |
| D | D | 64513 | 3 | 1 | 2 | 43 | USED | A | A | 65535 | 5 | 2 | 0 |
| C | C | 63521 | 2 | 2 | 3 | 50 | USED | B | B | 63187 | 6 | 1 | 0 |
| D | D | 64513 | 4 | 2 | 4 | 60 | USED | B | B | 63187 | 6 | 2 | 0 |
| C | C | 63521 | 2 | 3 | 5 | 0 | UNUSED | | | | | | |
| D | D | 64513 | 4 | 3 | 6 | 0 | UNUSED | | | | | | |
| 41 | 42 | 43 | 44 | 45 | 46 | 47 | 49 | 41 | 42 | 43 | 44 | 45 | 48 |

FIG. 5B

| STORAGE INFORMATION MANAGEMENT TABLE | | | | | | | | | | | | | |
|---|---|---|---|---|---|---|---|---|---|---|---|---|---|
| TARGET DEVICE (STORAGE DEVICE) | | | | | | | | INITIATOR DEVICE (STORAGE DEVICE/HOST) | | | | | |
| VENDOR NAME (PRODUCT NAME | | IDENTIFIER | | | | | | VENDOR NAME (PRODUCT NAME | | | | | |
| | | S/N | WWN | LUN | | IOPS | STATE | | | S/N | WWN | LUN | SHARE |
| C | C | 63521 | 2 | 3 | 5 | 0 | USED | A | A | 65535 | 5 | 2 | 1 |
| C | C | 63521 | 2 | 3 | 5 | 0 | USED | B | B | 63187 | 6 | 2 | 1 |
| D | D | 64513 | 3 | 1 | 2 | 0 | USED | B | B | 63187 | 6 | 1 | 0 |
| D | D | 64513 | 4 | 2 | 4 | 0 | USED | B | B | 63187 | 6 | 1 | 0 |
| | | | | | | | | | | | | | |
| 41 | 42 | 43 | 44 | 45 | 46 | 47 | 49 | 41 | 42 | 43 | 44 | 45 | 48 |

STORAGE SYSTEM, CONFIGURATION MANAGEMENT METHOD, AND PROGRAM

CROSS-REFERENCE TO RELATED APPLICATION

The present application claims priority from Japanese Patent Application No. JP 2005-110246 filed on Apr. 6, 2005, the content of which is hereby incorporated by reference into this application.

BACKGROUND OF THE INVENTION

The present invention relates to a storage system comprising a storage device (also called as a disk array device) provided with a storage controlling function with respect to storage resources, and particularly, relates to techniques for managing of configuration information including that of, for example, allocation and association of storage resources in the storage system.

In an example configuration of a conventional storage system, a storage device (abbreviated as an IS) serving as an initiator (abbreviated as an I) and a storage device (abbreviated as a TS) serving as a target (abbreviated as a T) are connected via a frame relay device (abbreviated as an R). In the storage system, the I and the T are in the superior-subordinate relationship, and the I unidirectionally accesses a storage volume (abbreviated as a V) which is owned by the T. The terms I and T are according to that of the standard of, for example, SCSI or Fibre Channel (abbreviated as FC). The R is an information processing device for relaying the communication between the I and the T. And, the R is, for example, is a storage device provided with a switch such as a FC-SW (Fibre Channel Switch) and with a relay function. The I is an information processing device such as a storage device (IS) or a host computer (also referred to as a host). The T is, for example, a storage device (TS) which is accessed from the I and responds by performing input/output with respect to the V owned by the T. For example, in response to a data input/output request from the host connected thereto, the IS performs input/output with respect to the V owned by the IS or the V owned by another storage device (TS).

Hereinafter, the V owned by an initiator (I) is referred to as an IV, and the V owned by a target (T) is referred to as a TV. The ID (identification information) or the address of a V is referred to as a VID. The unique ID of an IV is referred to as an IVID, and the unique ID of a TV is referred to as a TVID. The configuration relating to Vs in a storage system is referred to as a V configuration, and the configuration information thereof is referred to as V configuration information.

Recently, in the above described storage system having an I and a T, particularly, various functions such as the function of virtualization of storage resources for integrally handling Vs of the devices, or that for sharing TV(s) by a plurality of Is have been provided. When setting for associating IVs with TVs by, for example, VIDs, as V configuration information in the storage system is performed, the TVs can be utilized through access to the IVs. The R relays I-T communication for performing IV-TV access.

A technique relating to the V configuration information is described in Japanese Patent Application Laid-Open No. 2004-145901. In this technique, conversion of frames is performed in a switch device in accordance with a management table.

In the above described example of a conventional storage system, setting and management of the configuration information of ISs was performed in a configuration wherein a management server connected to the ISs via a LAN or the like and software therefor (storage management program) is introduced. An administrator performed operations including setting of the V configuration by use of, for example, a management server or a management terminal connected to each IS.

Therefore, additional equipment such as the LAN and the server device are required in addition to the elements such as the storage devices and the frame relay device (R) which are essential in the storage system configuration, which results in high cost. Moreover, the above described LAN is the network having a transfer rate lower than the transfer rate of the I/Fs between the storage devices and the R. Therefore, in V setting, limitations are imposed on the system by the above described transfer rate of the LAN. Thus, the performance in exclusive control of the setting of a V using the LAN and the management server becomes low, and the required performance may not be satisfied.

The technique described in above mentioned Japanese Patent Application Laid-Open No. 2004-145901 also requires additional equipment such as a management terminal or a management server connected to the switch device, etc.

SUMMARY OF THE PRESENT INVENTION

The present invention has been accomplished in view of the above described problems. And an object thereof is to provide techniques for realizing efficient setting and utilization of the configuration including Vs in a storage system having an I(s) and a T(s), with a low cost configuration not requiring additional equipment such as the LAN and the server device without limitations imposed thereon due to a low-transfer rate network. Particularly, another object of the invention is to provide techniques for realizing exclusive control by managing I-T V-mapping information for the virtualization of storage resources or the like.

Summaries of the typical elements of the present invention disclosed in the present application are simply described as the following. In order to achieve the above described objects, a storage system of the present invention comprises a storage device provided with a memory device and a storage control device (DKC) for controlling storage of data with respect to the memory device so as to handle it as a V, and having a function of RAID control, and the storage system is characterized by having below described technical means.

In a configuration having a frame relay device (R) such as a switch or a storage device for relaying the communication between a plurality of devices including the storage device, the storage system of the present invention manages configuration information of the devices connected to the R in a DB (database) provided in the R. The configuration information to be managed is, particularly, the information of allocation of Vs such as LUs in the storage system and V mapping in the devices, the information relevant thereto, etc. The device connected to the R is, for example, an IS or a host serving as an I, or a TS serving as a T. The R has ports for connecting the plurality of devices, a control unit for switching the connection between the ports, a DB or memory unit for retaining configuration information including a configuration such as the V mapping of the storage volumes of the devices connected to the R via the ports, and an exclusive control unit for performing an exclusive control process regarding the configuration information to be updated upon setting of the V configuration with respect to the DB for, e.g., I-T V-mapping among the devices of the storage system. In accordance with, for example, update of the configuration performed in the device connected to the R via the port, the R updates the configuration information in the DB while performing an exclusive control process thereof by the exclusive control unit.

For example, the system has a first storage device or a host serving as an I and a second storage device serving as a T which are connected to the R. With respect to the configuration information in the DB of the R, setting for mapping a first storage volume (IV) owned by the first storage device with a second storage volume (TV) owned by the second storage device is performed in a form including the information of association of IDs thereof and the ports. For example, setting for utilization such as exclusively using or sharing the TV by an I (first storage device) can be performed. After the setting, when access from the first storage volume to the second storage volume is to be performed between the devices connected to the R, relay is performed at the R in accordance with the configuration information in the DB.

Furthermore, in relation to the V mapping in the configuration information in the DB, the information of the association of an ID of the first storage device and an ID of the first storage volume in the device, an ID of the second storage device and an ID of the second storage volume in the device, an ID of the port used between the first storage device and the R, and an ID of the port used between the second storage device and the R is included.

Furthermore, in accordance with reception of a command from the first storage device, the R performs setting including mapping of the first and the second storage volumes. Upon the setting, the exclusive control unit obtains an update lock of the configuration information in the DB, updates the configuration information in the DB, and unlocks the update lock.

Furthermore, with respect to the first storage device, setting including mapping of the first and the second volumes is performed by, for example, a management terminal. The first storage device correspondingly transmits, in accordance with the setting including mapping of the first device, a command for registering configuration information to the R. The R receives the command for registration from the first storage device, and performs a process of updating the configuration information in the DB. Furthermore, the device connected via the port of the R performs, for example, a process of acquiring or a process of searching the configuration information of the device or that of another device in the DB by accessing the R. Furthermore, for example, a process of accessing the device connected to the R, acquiring the configuration information of the device, and updating the configuration information in the DB is performed from the R.

Furthermore, among the plurality of devices connected to the R, each of the devices serving as the Is or each of the devices serving as the Ts individually accesses the configuration information in the DB of the R so as to perform communication relating to setting of the V.

Furthermore, the R acquires information representing input/output performance or a load state with respect to the second storage volume (TV) in the device connected to the R via the port, and registers the information in the DB. For example, each of the devices connected to the R is provided with a function for measuring the input/output performance or load state. Based on comparison of the information representing the input/output performance, the R performs a process of switching from the port used in the paths of access to the second storage volume to another port of which information representing the input/output performance has a lower value.

The effects obtained by typical elements of the invention disclosed in the present application are simply described as the following. According to the present invention, efficient setting and utilization of the configuration including Vs in a storage system having an I(s) and a T(s) can be realized, with a low cost configuration not requiring additional equipment such as the LAN and the server device without limitations imposed thereon due to a low-transfer rate network. Furthermore, particularly, exclusive control of Vs can be realized by managing V mapping information for, e.g., the virtualization of storage resources.

Furthermore, particularly, in a case of a storage system having a plurality of Is and a plurality of Ts, communication between Is or between Ts via the R relating to setting of the V configuration can be newly realized. Moreover, particularly, by utilizing management of the V configuration in the R, a switching function of paths or ports corresponding to the input/output performance or the load state can be newly realized.

BRIEF DESCRIPTIONS OF THE DRAWINGS

FIG. 5A is table showing examples of the format and the setting of a storage information management table registered in a DB in the R, in the storage system of the first embodiment of the present invention;

FIG. 5B is a table showing examples of the format and the setting of a storage information management table registered in a DB in the R, in the storage system of the first embodiment of the present invention;

DESCRIPTION OF THE PREFERRED EMBODIMENTS

Figure 14A:
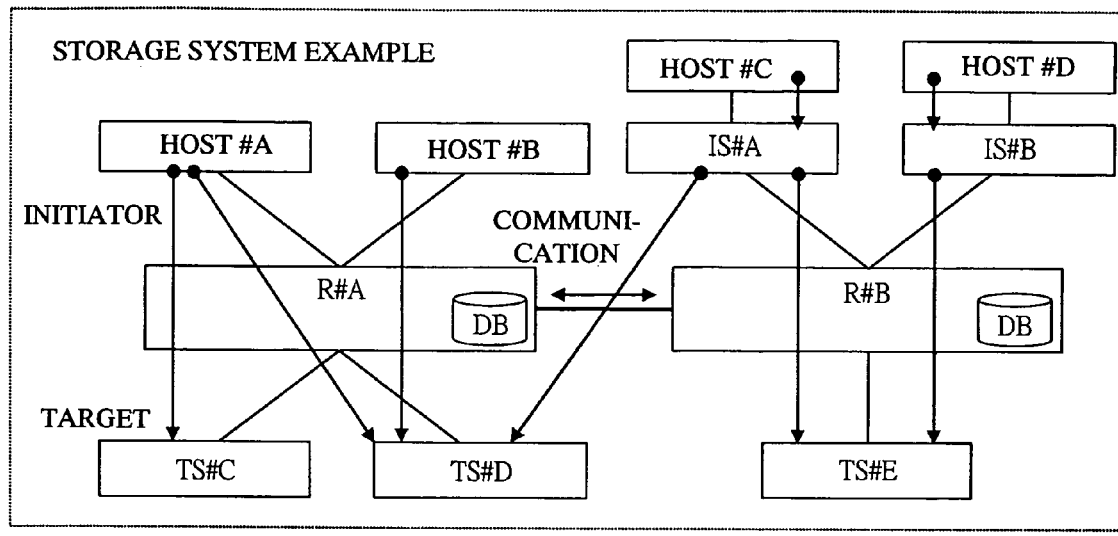
FIG. 14A is a diagram showing the configuration of storage systems of third embodiment of the present invention.
Figure 14B:
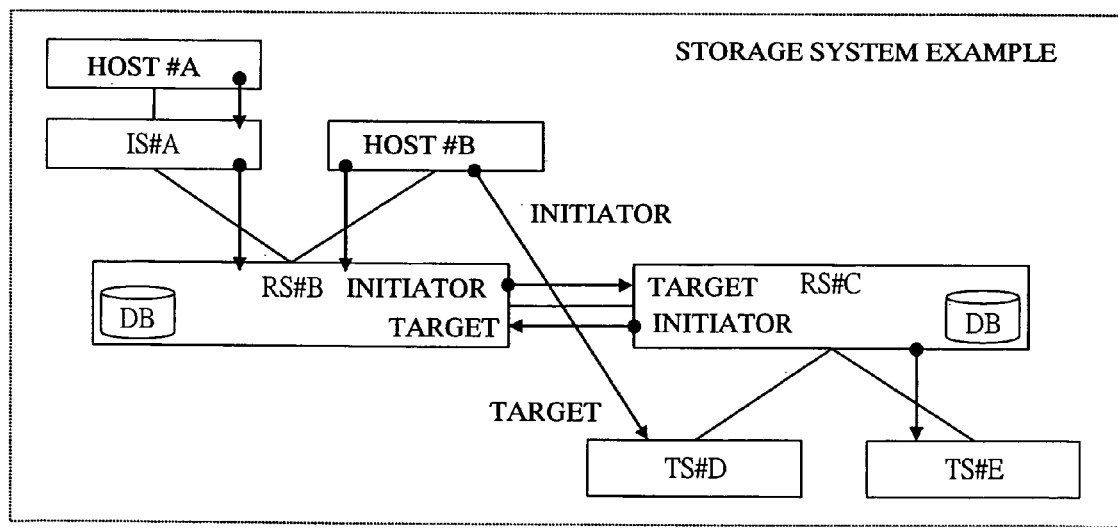
FIG. 14B is a diagram showing the configuration of storage systems of third embodiment of the present invention.
Figure 15:
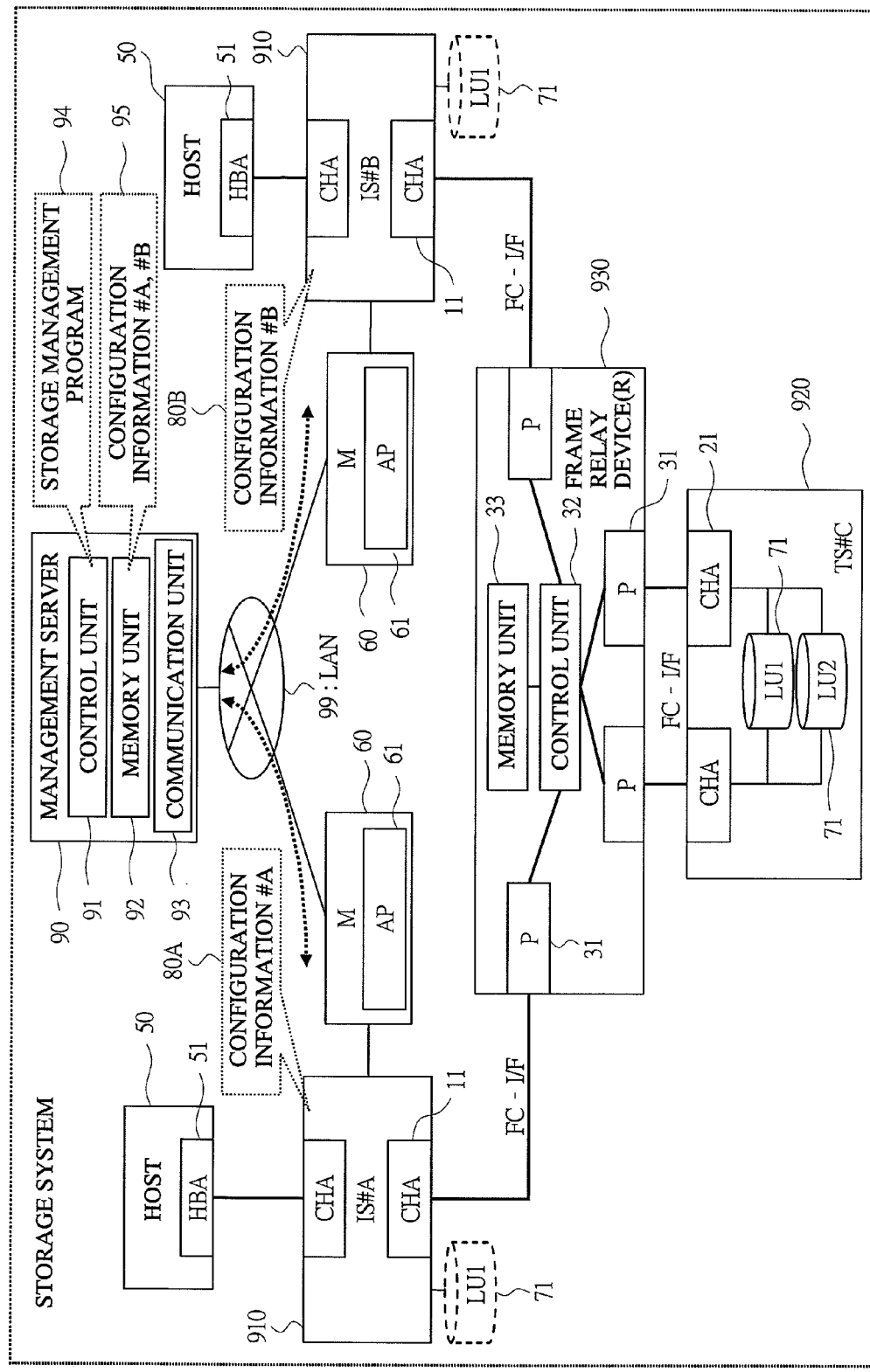
FIG. 15 is a block diagram showing a configuration example of a conventional storage system, for comparison with the embodiments.

Hereinafter, embodiments of the present invention will be described in detail with reference to drawings. It should be noted that, in all the drawings for explaining the embodiments, same members are basically denoted by the same reference numerals, and repeated explanations thereof are omitted. FIGS. 1 to 14 are the drawings for explaining the embodiments of the present invention. FIG. 15 is the drawing explaining an example of conventional storage system configuration for comparison with the present embodiments.

In a storage system of each embodiment, a DB and an exclusive control unit are provided in a frame relay device (R) that connects an I(s) and a T(s), as means for managing the configuration information including the V configuration of the entire storage system. The R, particularly, retains and manages the V configuration information including V mapping information between the I(s) and the T(s) in the devices connected to the R via ports.

<Conventional Configuration>

First, a configuration example of a conventional storage system will be explained with reference to FIG. 15. This system has two ISs #A and #B (910), one TS #C (920), an IS-TS frame relay device (R) 930, hosts 50 each of which connected to each IS 910, management terminals (represented by M) 60 each of which connected to each IS 910, and a LAN 99 and a management server 90 which are additional equipment. The connections between the storage devices (910 and 920) and ports of the R930 are that of FC-I/F (interface).

In this system, each of the ISs 910 is connected to the management server 90 on the LAN 99 via the M60. For example, the ISs 910 are installed within the same site, and the TS #C (920) of another corporation is connected to the other site via the R930. The IS 910 accesses the TS 920 so as to utilize LUs 71 which are TVs in the TS 920. The R 930 relays the communication from the ISs 910 to the TS 920. CHAs 11 and 21 serving as the ports of the ISs 910 and the TS 920 are connected to ports 31 of the R 930.

The R 930 has the plurality of ports 31, a control unit 32 for switching the connection between the ports 31, and a memory unit 33 for storing transfer data, etc.

To each IS 910 connected is the host 50 for accessing a LU 71 serving as an IV owned by the IS 910. A HBA (host bus adapter) 51 of the host 50 and the CHA 11 of the IS 910 are connected. The LU 71 serving as an IV owned by each IS 910 is a virtual V associated with the LU 71 serving as a TV owned by the TS 920.

The management server 90 manages configuration information 80A and 80B of the ISs 910 via the M60. The management server 90 has a control unit 91, a memory unit 92, and a communication unit 93. A storage management program 94 is executed by the control unit 91 so as to implement the functions of storage system configuration management. The management server 90 acquires the configuration information 80A and 80B of the ISs 910 and retains the information in the memory unit 92 as configuration information 95. The configuration information 95 includes the V configuration information for accessing the TVs owned by the TS 920. The communication unit 93 performs communication I/F processes with the LAN 99.

The M 60 collects and retains the configuration information 80 and the operating information of the connected IS 910. And the M 60 has a setting application program (AP) 61 for performing processes relating to maintenance/management of the IS 910. Also, the M 60 transmits the configuration information 80 to the management server 90 via the LAN 99, and updates the configuration information 80 in accordance with the instructions from the management server 90. An administrator can carry out setting of the configuration of the IS 910 by operating the M 60. Also, the administrator can carry out setting of the configuration of each of the ISs 910 by accessing the management server 90.

In this configuration, for example, when LU1 (71) of the TS #C (920) is to be set as a shared LU of the ISs #A and #B (910) and utilized, exclusive control for the setting and change of the V configuration for the setting thereof was carried out through the management server 90 on the LAN 99. For example, access is made from the M 60 in the IS #A (910) side to the management server 90 so as to require setting. Then, the management server 90 performs exclusive control regarding the setting of the target LU1 (71), thereby updating the configuration information 95 and causing the configuration information 80A and 80B of the ISs 910 to be updated. In this case, since exclusive control processes, etc. through the management server 90 on the LAN 99 are required, limitations are imposed by the comparatively low transfer rate of the LAN 99. Therefore, the ISs 910 and the hosts 50 utilizing the ISs 910 may not be able to fulfill the performance required in, for example, setting processes for utilizing the TVs of the TS 920. For example, when setting for utilizing the TVs of the TS #C (920) as a shared LU for the ISs #A and #B (910) is to be executed, if exclusive control of the Vs therefor is performed by the management server 90 on the LAN 99, there have been risks that the required performance may not be fulfilled. The transfer rate of the LAN 99 is, for example, in a conventional LAN, 1 G/100 M/10 Mbps. Meanwhile, the transfer rate of the I/Fs of the storage devices and the R 930 is, for example, in a conventional FC-I/F, 2 G/1 Gbps.

In the present invention, it has been studied that whether the V configuration can be managed only with the devices essential for storage system configuration, without providing additional equipment such as the server (90) and the LAN (99). When the V configuration information is managed within essential devices, the above described additional equipment is not required, and the limitations due to the low transfer rate of the LAN (99) can be avoided.

First Embodiment

A storage system of a first embodiment of the present invention will be described. The storage system of the first embodiment has a configuration in which two ISs #A and #B (10) and two TSs #C and #D (20) are connected to a frame relay device (R) 30, wherein the configuration information of each of the connected devices is managed in a DB 40. The R 30 comprises a FC-SW 30A. The R 30 executes exclusive control processes upon V configuration setting between the ISs 10 and the TSs 20.

<Storage System>

Figure 1:
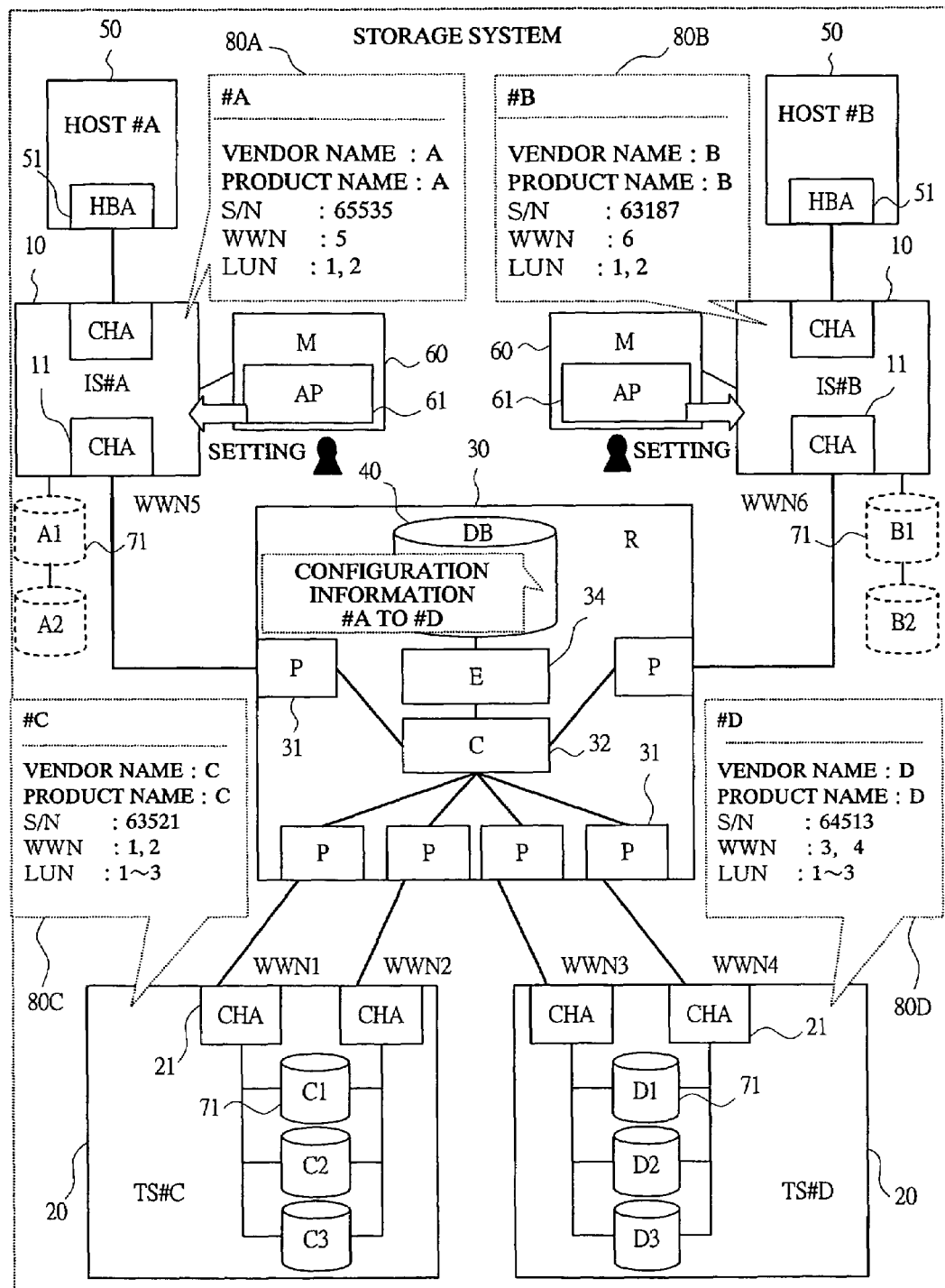
FIG. 1 is a block diagram showing the entire configuration of a storage system of a first embodiment of the present invention.

FIG. 1 is a block diagram showing the entire configuration of the storage system of the first embodiment. The present system has two ISs #A and #B (10), two TSs #C and #D (20), one frame relay device (R) 30 for relaying the communication between the storage devices 10 and 20, hosts #A and #B (50) each of which connected to each IS 10, and management terminals (M) 60 each of which connected to each IS 10. The R 30 comprises a FC-SW 30A such as that shown in FIG. 4. For example, the ISs #A and #B (10) are installed within the same site, and outside thereof, the TSs #C and #D (20) of other corporation (s) are connected thereto via the R 30.

The IS 10 subjects the V which is provided within the own device to data input/output processes in accordance with requests from, for example, the host 50. The IS 10 also accesses the TSs 20 in accordance with needs so as to utilize (data input/output) LUs 71 serving as TVs in the TSs 20. The R 30 relays the communication including data transfer between the IS 10 side and the TS 20 side. CHAs 11 and 21 serving as ports in the ISs 10 and the TSs 20 are connected to ports 31 of the R 30. Each of the ISs 10 and each of the TSs 20 is connected to the R 30 by means of, for example, FC-I/F. Each of the ports is identified within the storage system by a WWN.

The R 30 has the plurality of ports (represented by P) 31, a control unit (represented by C) 32 for switching the connection between the ports 31, an exclusive control unit (represented by E) 34, and a storage information management database (represented by DB) 40. Configuration information #A to #D of the devices connected to the R 30 is retained in the DB 40. The R 30 has the exclusive control unit 34 and the DB 40 as characteristic members. And a program or hardware logic for storage system configuration management and exclusive control is executed in the control unit 32 and the exclusive control unit 34.

By means of the connection of the R 30 according to FC-I/F, a SAN (Storage Area Network) can be established. In that case, HBAs 51 of the hosts 50 and the CHAs 11 and 21, which are provided in the ISs 10 and the TSs 20, connected to the R 30 perform communication processes in accordance with a FC protocol. Transmitted and received data according to the FC protocol is controlled with data blocks having a predetermined length serving as units. And data I/O with respect to Vs is processed by transferring data I/O requests (block access requests) of block units.

Each of the ISs 10 has, at least, the CHAs 11 and a LU 71 serving as an IV, subjects the IV to input/output processes in response to access performed from the host 50, and utilizes (input/output) the TVs by accessing the TSs 20 via the R 30 in accordance with needs. LUs 71 serving as IVs owned by the ISs 10 are associated with the LUs 71 serving as TVs owned by the TSs 20 in V mapping information. Configuration setting for utilizing the IVs and the TVs is performed on the IS 10 from the M 60.

The TS 20 has, at least, the CHA 21 and the LU 71 serving as a TV, and subjects the TVs to input/output processes in response to access from the R 30 side. The TS 20 may be a storage device provided with the functions same as that of the IS 10, or may be a device provided with other functions.

Each of the devices such as the ISs 10 and the TSs 20 connected to the R 30 is provided with an I/F(s) for performing processes of, for example, referencing and changing V configuration with the R 30. That is, each of the devices is provided with, for example, a function for causing the R 30 to perform processes by issuing commands or requests from the devices to the R 30 via ports, and receiving the responses therefore from the R via the ports.

The host 50 has the HBA 51, accesses the IS 10 according to data I/O requests, and performs data I/O with respect to the IVs by utilizing the functions of the IS 10. The HBA 51 of each host 50 and the CHA 11 of the corresponding IS 10 are connected. Communication is performed between the host 50 and a DKC 100 by means of a predetermined I/F.

The M 60 collects and retains configuration information 80, operating information, etc. of the connected IS 10. And the M 60 has a setting application program (AP) 61 for performing processes relating to maintenance and management of the IS 10. A user such as an administrator can perform setting of the configuration of the IS 10 by operating the M 60. The configuration information 80 includes V configuration information required for accessing the TVs owned by the TS 20. Also, it may be arranged such that the user can perform setting of the configuration with respect to the IS 10 by use of, other than the M 60, a client terminal which is communicatably connected to the IS 10 and provided with a program for setting. Similarly, a device such as the M 60 may be connected to the TS 20. In the setting of the configuration information 80 in individual IS 10, V setting, etc. is performed in accordance with a conventional setting method and process.

Configuration information #A to #D (80A to 80D) of the storage devices (10 and 20) shown in FIG. 1 is, for example, as the following. In the configuration information #A (80A) of the IS #A (10), a vendor name 41 is "A", a product name 42 is "A", a S/N 43 is "65535", and a WWN 44 of the connection port between the R 30 is "5". In addition, LUNs 45 which can be used for the LUs 71 owned by the IS #A (10) are "1" and "2". In the configuration information #B (80B) of the IS #B (10), the vendor name 41 is "B", the product name 42 is "B", the S/N 43 is "63187", and the WWN 44 of the connection port between the R 30 is "6". In addition, the LUNs 45 which can be used for the LUs 71 owned by the IS #B (10) are "1" and "2". In the configuration information #C (80C) of the TS #C (20), the vendor name 41 is "C", the product name 42 is "C", the S/N 43 is "63521", and the WWNs 44 of the connection ports between the R 30 are "1" and "2". In addition, the LUNs 45 which can be used for the LUs 71 owned by the TS #C (20) are "1" to "3". In the configuration information #D (80D) of the TS #D (20), the vendor name 41 is "D", the product name 42 is "D", the S/N 43 is "64513", and the WWNs 44 of the connection ports between the R 30 are "3" and "4". In addition, the LUNs 45 which can be used for the LU 71 owned by the TS #D are "1" to "3".

<Storage device>

Figure 2:
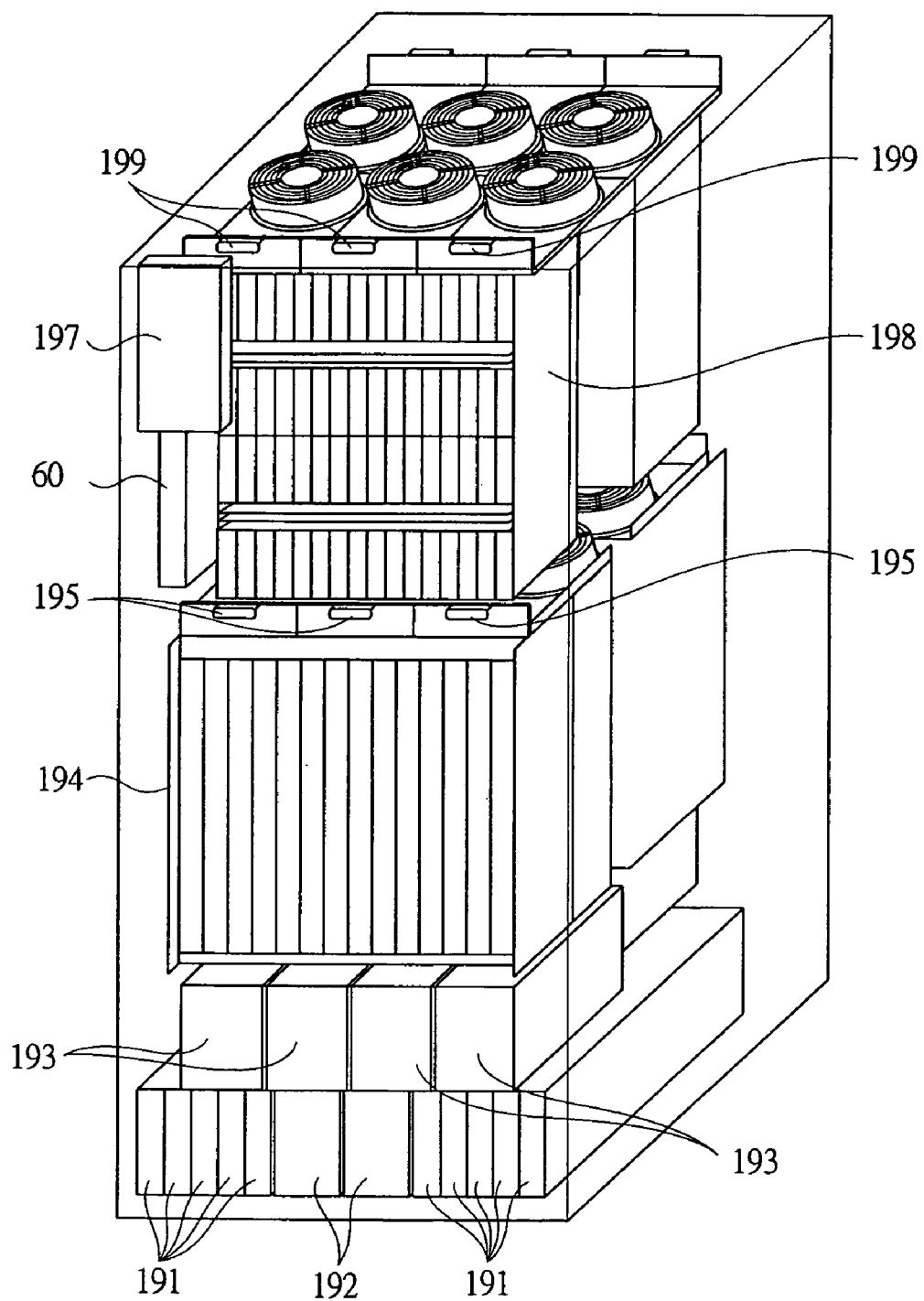
FIG. 2 is a perspective view showing the exterior appearance of the entire hardware configuration of a storage device corresponding to, for example, an IS, in the storage system of the first embodiment of the present invention.

FIG. 2 is a perspective view showing the exterior appearance of the entire hardware configuration of a storage device corresponding to the IS 10, etc. The storage device comprises, for example, a base chassis and an expansion chassis. In FIG. 2, the base chassis is viewed from an upper right position which is in the front side and oblique to the chassis in a transparent manner, and the disposition of members in the chassis is shown. The base chassis is the minimum constitutional unit, and provided with both a storage control function implemented by, e.g., the DKC 100, and a storage function implemented by, e.g., HDDs 70. The expansion chassis is an option unit, and provided with a storage function. The storage control function controls, according to requests and orders from other devices which are communicatably connected thereto, storage of data with respect to storage areas provided by the storage function. The chassis are communicatably connected with one another by communication cables.

In the base chassis, a plurality of batteries 191, a plurality of AC boxes 192, a plurality of AC-DC power supplies 193, a DKC box 194, a plurality of fans 195, a SVP 60, a panel 197, a DKU box 198, a plurality of fans 199, etc. are provided.

The batteries 191 are connected to the AC-DC power supplies 193, and serve as backup power supplies upon power failure. The AC boxes 192 are the members to which input AC power supplies are connected, and connected to the AC-DC power supplies 193. The AC-DC power supplies 193 perform AC-DC conversion with respect to the input AC power supplies, and supply DC power to members of the DKC 100, etc.

The DKC box 194 has a structure including a plurality of slots or the like in which control packages composing the DKC 100 can be loaded. Each of the control packages is connected in each slot such that it can be inserted and removed along guide rails, and the control packages can be replaced in control package units. The control package is integrally made into a module including, in the center thereof, a board provided with functions of, e.g., host I/F, and, added thereto, an electrical and mechanical structure of, e.g., a canister for loading it onto the box. The DKC 100 is implemented by the interconnection of various types of the control packages. The DKC box 194 has a backplane board in the interior thereof for the interconnection of the control packages. Connectors of the control packages side are connected to the connectors of the backplane board side in the slots.

The SVP (service processor) 60 is an information processing device having a processor which is in charge of processes of maintenance and management of the storage device. In the present embodiment, the SVP 60 corresponds to the above described M 60. The SVP 60 has the form of, for example, a laptop PC, is housed in the chassis in normal time, and is taken out to the front and used when needed. Maintenance personnel can perform processes of maintenance and management by operating the SVP 60. On the panel 197, a switch(es) for the basic operations of the storage device and a display device(s) for displaying various information are disposed. The plurality of fans 195 and 199 provided in the chassis performs air-cooling by sending air to the members of the chassis.

Each of the plurality of HDDs 70 composing a DKU (disk unit) 200 is connected to the DKU box 198 in the form of a HDU (HDD unit) such that it can be inserted and removed. The HDU includes the HDD 70 and is integrally made into a module to which the structure of, e.g., a canister for loading it to the box is added.

Figure 3:
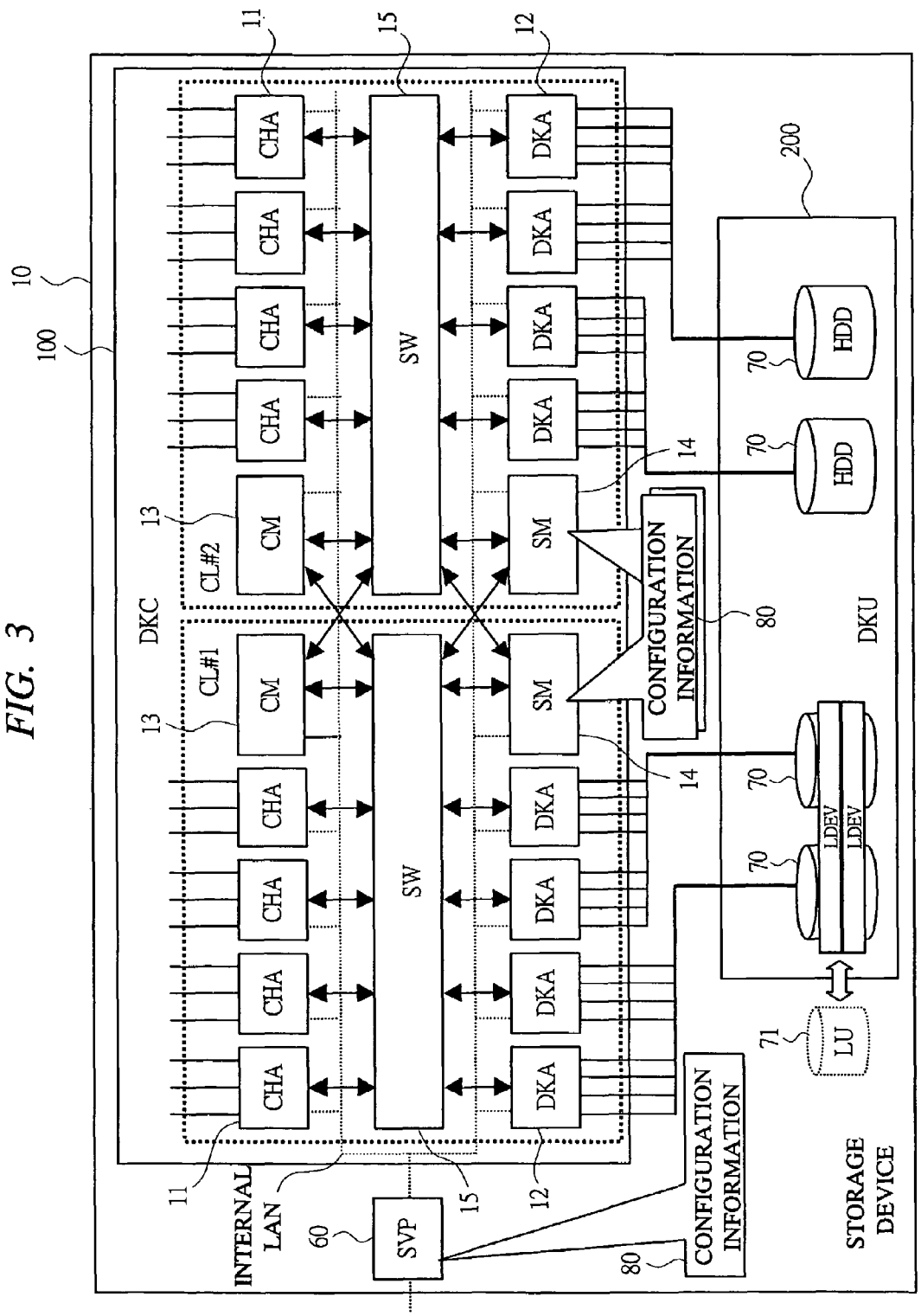
FIG. 3 is a block diagram showing the functional configuration of a storage device serving as an IS, in the storage system of the first embodiment of the present invention.

FIG. 3 shows a functional configuration of the storage device serving as the IS 10. The configuration of the TS 20 is also same as this. The configuration of the storage device includes the DKC 100, the DKU 200, and the SVP (M) 60. The DKC 100 comprises the interconnection of the control packages corresponding to the functions of the CHAs 11, the DKAs 12, etc. The DKC 100 connects to the DKU 200 and executes storage control. The DKC 100 reads and writes data from or to Vs set own the HDDs 70, and sets a predetermined RAID level for the group of the HDDs 70, thereby enabling RAID control.

The DKC 100 is communicatably connected to, through the ports owned by the CHAs 11, the host 50, the R 30, other storage control devices, etc. which are outside thereof. Also, the DKC 100 is communicatably connected to the HDDs 70 in the DKU 200 through the DKAs 12. The SVP 60 is connected to the members of the DKC 100 through an internal LAN so as to be able to communicate with them.

The storage device employs a cluster configuration for improving the availability. For example, the DKC 100 comprises double control clusters (CLs) #1 and #2 together with power supply units. Even when one CL is down due to failure or the like, the service can be kept provided by keeping the operation of the other CL.

The DKC 10 has the CHAs (channel control units) 11, the DKAs (disk control units) 12, CMs (cache memories) 13, SM (shared memories) 14, and SWs (high-speed crossbar switches) 15.

The CHAs 11 are functional members for performing channel I/F control with respect to external devices. The DKAs 12 are members for performing disk I/F control with respect to the HDDs 70. The CHAs 11 and the DKAs 12 are provided with, for example, port units, I/F control units, and DMA control units. The CHA 11 can be configured to have a plurality of port units. The port units perform communication processes with external devices in accordance with corresponding protocol. The I/F control units perform, for example, port control and DMA data transfer control. The DMA control units perform DMA data transfer processes.

In the present embodiment, characteristic processes such as configuration setting can be performed with the R 30 through the processes of the CHAs 11. The CHAs 11 execute programs for performing, e.g., configuration setting processes. Setting requests or the like are issued from the SVP 60 to the CHAs 11, and the setting requests or the like are transmitted from the CHAs 11 to the R 30 via ports, thereby causing the R 30 to perform processes. In the DKC 100, for example, configuration setting processes may be performed in processing units other than the CHAs 11.

The CMs 13 and the SMs 14 are the memories shared by the members such as the CHAs 11 in the DKC 100. The CMs 13 are used for caching, for example, the data input to or output from the Vs. The SM 14 is used for storing, for example, the configuration information 80 and control information. The data and information on the CMs 13 and the SMs 14 are backed up and the contents thereof are retained. The SW 15 is a connection network for transferring data by switching connection paths between members such as the CHAs 11, the DKAs 12, the CMs 13, and the SMs 14.

In the DKU 200, Vs are the physical volumes depending on, for example, the HDDs 70, or the logical volumes set over the physical volumes. In the present embodiment, LDEVs (logical devices) and LUs (logical units) are employed as the logical volumes. The LDEV is a storage area which is set over a group of physical volumes and serves as a unit of RAID control. The LU is a storage area which is associated with at least one set of the LDEVs serving as an actual V. The host 50 performs access by specifying LUs.

In the present system, the LU is mainly used as a unit for allocating storage resources among the devices, and V mapping means the mapping of LUs. The IV is a LU 71 which is handled by the IS and viewed from the host 50 as an accessible V. The setting of mapping the IVs with the TVs in the TSs 20 can be performed. The IVs and the TVs can be accessed by specifying VIDs such as LUNs. In the TSs 20, the LUs 71 serving as TVs are associated with actual Vs such as LDEVs.

<Management Terminal (SVP)>

The SVP (M) 60 is connected to, through an internal LAN, each of the CHAs 11, the DKAs 12, the CMs 13, and the SMs 14 of the DKC 100. The SVP 60 is formed to be built in or externally connected to the storage device. And in the present example, the SVP is internally connected to the DKC 100. The SVP 60 may be in, for example, the form dedicated to maintenance and management, or the form in which a general-purpose computer is provided with maintenance and management functions. Also, the form in which a device for maintenance and management other than the SVP 60 is communicatably connected to the outside of the storage device may be employed. For example, the host 50 for installing and executing the programs for maintenance and management may be used as the device for maintenance and management.

The SVP 60 performs management of various information including the configuration information 80 of the storage device through the processes of the AP 61, so as to reference/acquire/update the configuration information 80 in the SM(s) 14. When a user such as an administrator operates the SVP 60, through GUI display to a display screen, for example, the physical disk configuration of the DKU 200, setting of the LUs and LDEVs, installation of the programs to be executed in, e.g., the CHAs 11, and a recovery process of the time when failure occurs can be performed. Particularly, at the SVP 60, setting of the V mapping relating to utilization of the TVs among a plurality of devices such as the ISs 10 can be performed with respect to the configuration information 80.

The SVP 60 is provided with, for example, input devices such as a CPU, a memory, ports, and a keyboard, an output device such as a display, a storage device such as a HDD, and a storage medium reading device such as a FD drive. The CPU performs control of the entirety, and executes programs in the memory so as to implement control including maintenance and management functions. The AP 61 and the information of, for example, the configuration information 80 of the ISs 10 is stored in the memory and the storage device. The ports are connected to, for example, the internal LAN. Maintenance management is performed when the user operates, for example, the input devices or the output devices.

<Host>

The host 50 is an information processing device in the form of, for example, a PC, a workstation, a server, or a mainframe computer which is provided with a CPU, a memory, a HBA 51, etc. In the host 50, when various programs in the memory are executed by the CPU, the functions as a host are implemented. The host 50 is provided with, for example, a program for data I/O with respect to the storage device, and an application program for providing information processing service by utilizing data I/O with respect to the storage device. Also, the host 50 is able to serve as a server which is communicatably connected to client devices for providing service. In addition, the host 50 may be formed to be connected to the R 30. In that case, the host 50 performs setting of V mapping in the same manner as the IS 10 does, so as to perform access to the TVs as an I to the TSs 20 via the R 30.

<Frame Relay Device>

Figure 4:
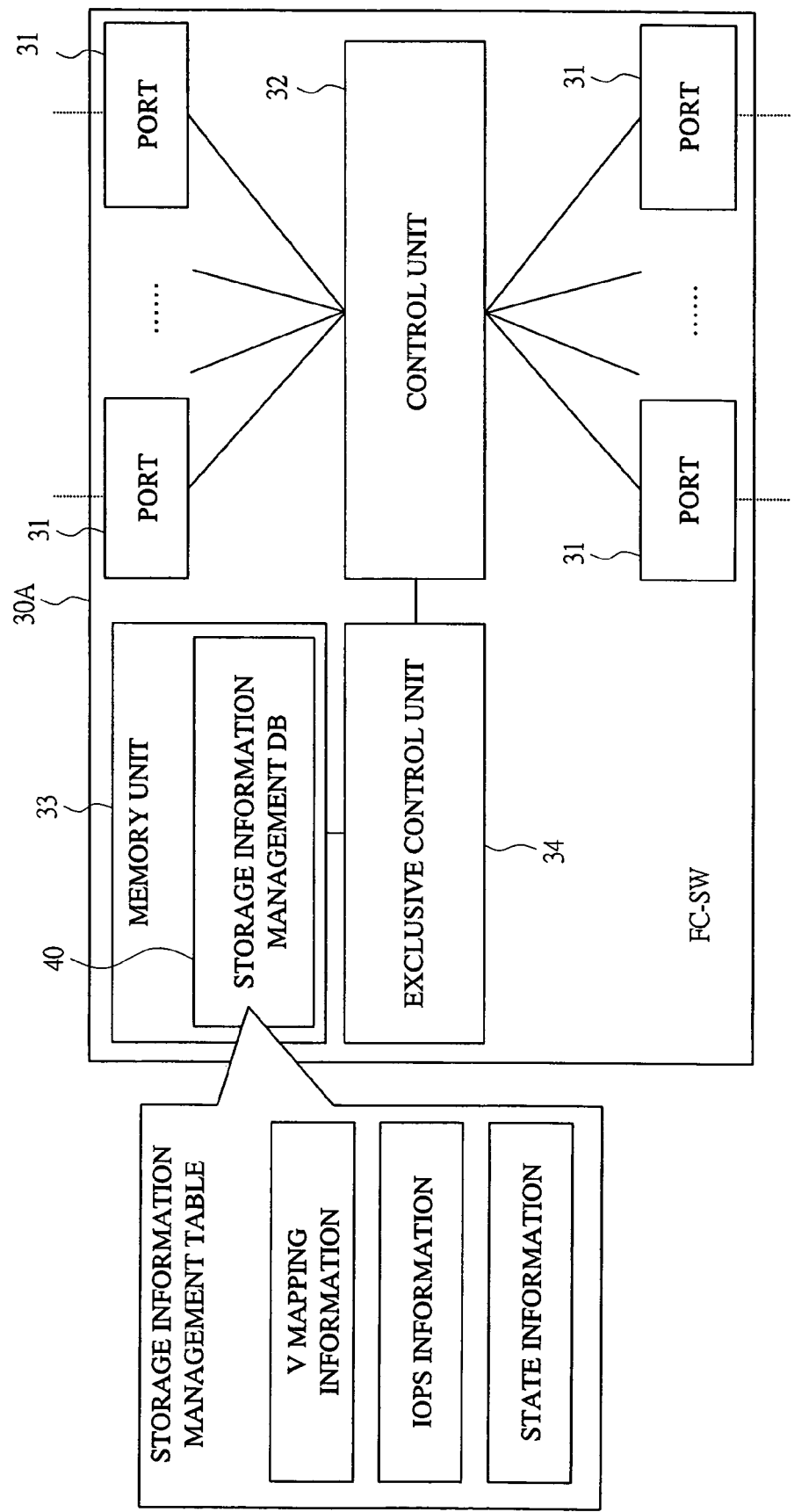
FIG. 4 is a block diagram showing the configuration of a FC-SW serving as a frame relay device (R), in the storage system of the first embodiment of the present invention.

FIG. 4 is a block diagram showing a configuration of the FC-SW 30A serving as the frame relay device (R) 30. The FC-SW 30A has the plurality of ports (also called as nodes) 31, the control unit (C) 32, a memory unit 33, and the exclusive control unit (E) 34. The memory unit 33 retains the storage information management DB (DB) 40. Each of the ports 31 is associated with a WWN according to FC. In the port 31, communication processes with the outside according to the FC protocol are performed. The control unit 32 has a configuration including a high-speed crossbar switch or the like, and performs control of switching the connection between the ports 31. Thereby, the control unit 32 switches the connection paths between, for example, Is and Ts and transfers data. The exclusive control unit 34 performs processes of reading or writing the information in the DB 40, and particularly, executes exclusive control processes relating to the setting for utilizing Vs.

The DB 40 contains a storage information management table (hereinafter, also referred to as a table). The table has V mapping information, IOPS information, state information, etc. The V mapping information is the information of association of Vs in I-T, and includes, for example, association of IVIDs, TVIDs, and used ports. The IOPS information is the information representing the input/output performance of the paths for utilizing the Vs. The state information is the information for managing the state of setting and utilization (input/output) of the Vs.

For example, FC or SCSI can be used as the communication I/F between the storage devices (10 and 20) and the R 30. For example, when FC is used, a HBA (host bus adapter) which is connected to a storage device and compliant with GS-4 specification of the FC specification, and FDMI (Fabric-Device Management Interface) defined in the GS-4 specification can be used with respect to the R 30. Alternatively, for example, when SCSI is used, unused pages of "Mode Select"/"Mode Sense" of SCSI-standard commands can be used. By use of such I/F, operations such as registration/referencing/deletion of information for later described configuration setting can be performed from the devices such as the ISs 10 to the DB 40.

<Utilization of V>

When the ISs 10 are to utilize the TVs of the TSs 20 by use of the IVs, the ISs 10 perform, with respect to the DB 40 of the R 30, setting of the V configuration information including that of association between the IVs and the TVs. First, the configuration information of an IV is set and retained in an IS 10 and the M 60 thereof. Meanwhile, the configuration information of a TV is set and retained in a TS 20. Then, the V configuration information including the target IV-TV V-mapping information is set and retained in the table in the DB 40 of the R 30. As a result of setting V configuration information from the IS 10 etc. with respect to the R 30, access such as data input/output for utilizing the TV can be made from the IS 10 to the TS 20.

The utilization mode of the TVs may be, for example, in accordance with the setting, a mode in which one IS 10 accesses one TV by exclusively using it by use of one IV, a mode in which a plurality of ISs 10 access one TV by sharing it by use of the IVs thereof, or a mode in which one IS 10 accesses a plurality of TVs collectively by use of one IV.

In the present system, exclusive control regarding the target V is required in V setting processes corresponding to the above described various utilization types. In the present embodiment, the exclusive control unit 34 of the R 30 executes the processes of the above described exclusive control.

The flow of normal utilization of the IV-TV that has undergone V mapping setting in corresponding devices and the DB 40 of the R 30, i.e., the case in which access of inputting or outputting data to or from a TV is made by accessing an IV, is as the following. There provided a state in which a LU 71 serving as an IV is provided in an IS, and a LU 71 serving as a TV which is associated with the IV is provided in a TS 20. The host 50 for the IS 10 requests data I/O to the IV by specifying a LUN (or an IVID) viewed from the host 50. The IS 10 subjected to access to an IV by the host 50 accesses, if the target IV is associated with a TV, the TS 20 via the R 30 in accordance with the configuration information 80 owned by the IS. That is, the IS 10 transmits a request specifying the LUN (or IVID) of the target IV to the R 30. With respect to the access from the IS 10, the R 30 relays the access to the corresponding TS in accordance with the mapping of the target IV and the TV in the V configuration information in the DB 40. That is, the R 30 transmits a request specifying the LUN (or TVID) of the target TV to the corresponding TS 20. The TS 20 subjects, in response to the request from the R 30, the actual V corresponding to the specified TV to a data input/output process, returns the response thereof to the IS 10 via the R 30. And the IS 10 returns the response to the host 50. The relay process in the R 30 in normal V access is same as a conventional process.

<Storage Information Management DB>

FIGS. 5A and 5B show examples of the format and the setting of the storage information management table registered in the DB 40 in the R 30. FIG. 5A shows a setting example of the table corresponding to the configuration information #A to #D (80A to 80D) shown in FIG. 1 and a V mapping state shown in FIG. 6. FIG. 5B shows a setting example of the table corresponding to the case in which a V is utilized by sharing it in the manner shown in FIG. 6.

Examples of the items to be registered in the DB 40 include (1) RAID mapping information, (2) information of input/output performance or load relating to V access, and (3) state information required in control for setting or utilization (input/output) of Vs. The RAID mapping information of (1) includes the V configuration information required for RAID control performed among the devices. The information of (2) includes, for example, IOPS information in the paths to TVs. The information of (3) is the information representing the state of the V configuration information of TVs such as the state of registration and update, and the information representing the state that, e.g., data input/output (update) is being performed with respect to TVs.

In FIG. 5A, the table has, when broadly categorized, the information of T side and the information of I side. The T-side information is the information relating to the storage devices (TSs 20) having TVs, and the I-side information is the information relating to the storage devices (ISs 10), hosts, etc. which are in the side for reserving and utilizing the TVs. The T-side information includes, as the items thereof, for example, a vendor name 41, a product name 42, a S/N 43, a WWN 44, a LUN 45, an identifier (actual VID) 46, IOPS 47, and a state 49. The I-side information includes, as the items thereof, for example, a vendor name 41, a product name 42, a S/N 43, a WWN 44, a LUN 45, and share 48.

The items of the tables and the parameters thereof will be described. The vendor name 41 represents the vendor name of the manufacturer of the corresponding device such as a storage device. The product name 42 represents the name of the corresponding device. The S/N 43 represents the serial number of the corresponding device and serves as the unique ID of the corresponding device in the storage system.

The WWN (World Wide Name) 44 is the unique ID representing the connected port and is, for example, an 8-byte value used in, e.g., FC. For example, the WWN 44 in the T-side information is the information of the used port in IV access between an IS 10 and the R 30. Meanwhile, the WWN 44 in the I-side information is the information of the used port in TV access between a TS 20 and the R 30.

The LUN 45 is the LU number and the VID used within a device. The LUN per se does not serve as an unique ID in the storage system, and may use similar information, for example, {0, 1, 2 . . . } among the devices. Each V can be uniquely identified in the storage system by associating the LUN 45 with other information such as the S/N 43.

The identifier (actual VID) 46 is the ID of an actual V in a storage device which is associated with the LUN 45, and in the present example, is a LDEV number. The LDEV number is the ID used within a TS 20. The identifiers (actual VIDs) 46 may be managed also in the information of the IS 10 side in the table.

The IOPS (Input Output Per Second) 47 is the information representing the input/output performance in, for example, a port on the path to the corresponding TV or the accessed body. In the present example, the value of the IOPS 47 is a Read/Write processed number per second in, for example, the port of a CHA 21 of a TS 20 on the path to the corresponding V. Other than that, the value of the IOPS 47 may employ predetermined measured values of, for example, the IOPS in I/O at a port of a CHA 11 of an IS 10 or a port 31 of the R 30, the issue number or the rate of I/O access from a host 50 to the corresponding V, or the processed number in a processor.

The share 48 serves as the information representing the utilization type in setting of the corresponding V, and in the present example, represents whether or not it is in the state in which the TV of the TS 20 is shared by a plurality of ISs 10, i.e., a shared LU is set, by means of "1"/"0".

The state 49 is the information representing the state of setting and utilization of the corresponding V, and, for example, represents "used"/"unused"/"updating". The "used" represents that the corresponding V has been registered and set in the I-T V mapping. The "unused" represents that the corresponding V has not yet been set in the I-T mapping. The "updating" represents that a V in the "used" state is being updated due to, for example, data write. Also during a setting process in the R 30 for V mapping, the value of the state 49 is controlled to be the "updating" state by the process of the exclusive control unit 34. In the "updating" state, access to and setting change of the corresponding V performed by other devices is prohibited.

In the V mapping information in the table in the DB 40, between the LUs 71 of IS10-TS20, association of the IVs and the TVs is described in the form including IVIDs and TVIDs and used port information. For example, a combination of a S/N 43 of an IS 10 and a LUN 45 used in the IS 10 is employed as the IVID (unique ID of an IV in the storage system). For example, a combination of a S/N 43 of a TS 20 and a LUN 45 used in the TS 20 is employed as the TVID (unique ID of a TV in the storage system). In addition, VIDs are associated with the WWNs 44 which are the unique IDs of the ports. In the present example, although a combination of a S/N 43 and a LUN 45 is employed as the unique ID (global unique ID) of each of the Vs in the storage system, other information may be employed.

In the display process of the program in configuration setting for, e.g., the M 60 using a display screen, the configuration information and the relevant information can be displayed by GUI, and, for example, the configuration information can be displayed in the format of the table shown in FIG. 5.

<V Mapping>

Figure 6:
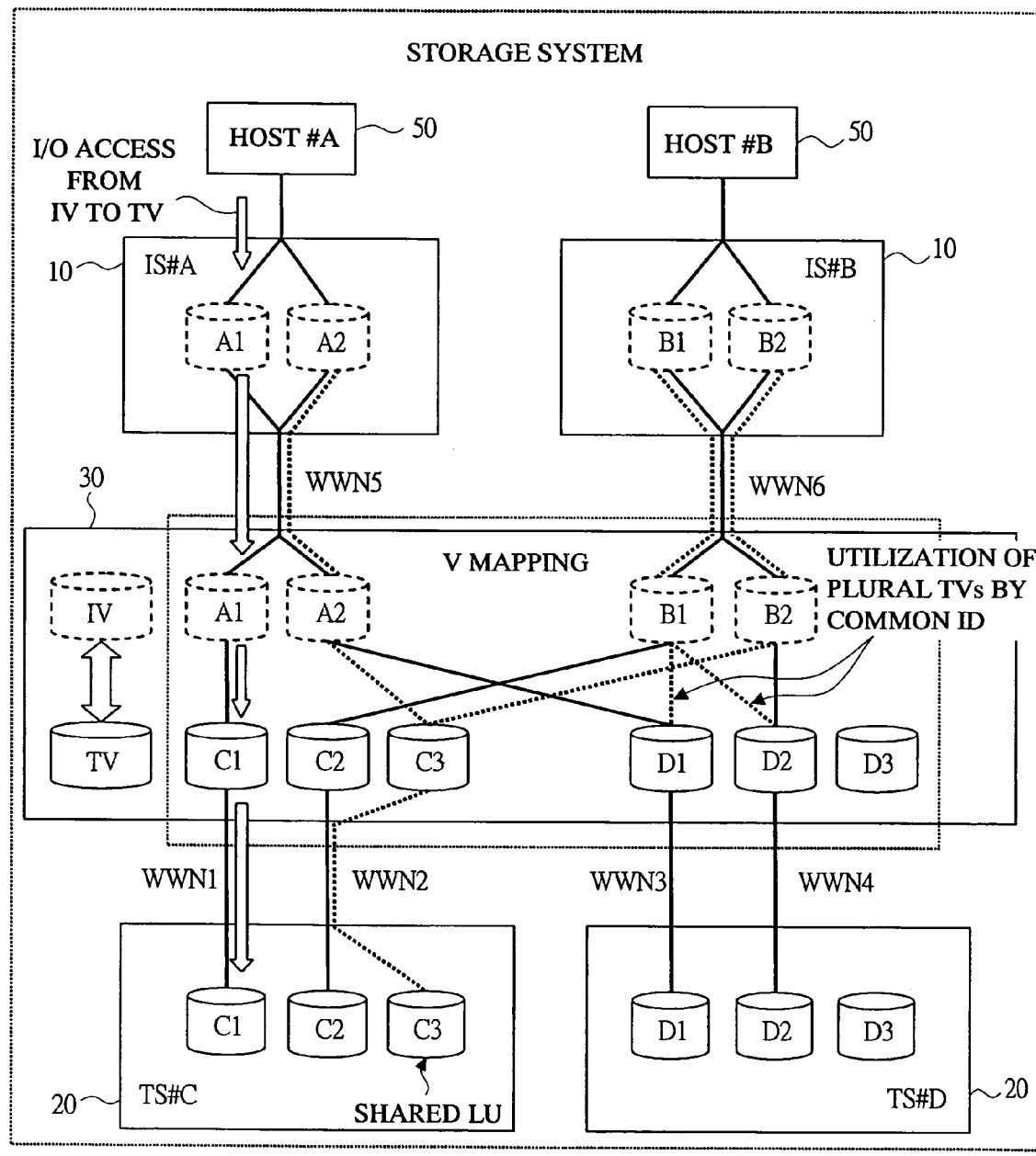
FIG. 6 is an explanatory diagram showing an example of I-T V mapping in the R, in the storage system of the first embodiment of the present invention.

FIG. 6 is an explanatory diagram showing an example of the I-T V-mapping in the R 30. The state of the present V mapping corresponds to the device configuration (configuration information #A to #D) of FIG. 1 and the setting state of the tables of FIGS. 5A and 5B. For example, the VID of a V having the S/N 43 of "A" and the LUN 45 of "1" is represented by, e.g., "A1".

The state of the present V mapping is as the following. The IS #A (10) has, as LUs 71 serving as IVs, A1 and A2 corresponding to "0" and "1" of the LUN 45. The IS #B (10) has, as LUs 71 serving as IVs, B1 and B2 corresponding to "0" and "1" of the LUN 45. A1, B1, etc. correspond to IVIDs. The TS #C (20) has, as LUs 71 serving as TVs, C1 to C3 corresponding to "0" to "3" of the LUN 45. The TS #D (20) has, as LUs 71 serving as TVs, D1 to D3 corresponding to "0" to "3" of the LUN 45. C1, D1, etc. correspond to TVIDS. The host #A (50) utilizes the IVs {A1 and A2} of the IS #A (10). The host #B (50) utilizes the IVs {B1 and B2} of the IS #B (10).

In the state between the IVs and the TVs, as shown by solid lines, each of the pairs, i.e., A1 and C1, A2 and D1, B1 and C2, and B2 and D2 is mapped in accordance with the table of FIG. 5A. In the access from the IVs {A1 and A2}, the port of WWN5 is used. In the access from the IVs {B1 and B2}, the port of WWN6 is used. In the access to the TV {C1}, the port of WWN1 is used. In the access to the TV {C2}, the port of WWN2 is used. In the access to the TV {D1}, the port of WWN3 is used. In the access to the TV {D2}, the port of WWN4 is used.

For example, the V mapping of A1-C1 is shown in the first line of the table of FIG. 5A. In the I-side set are "A" as the vendor name 41 and the product name 42, "65535" as the S/N 43, "5" as the WWN 44, "2" as the LUN 45, and the IV (A1) having the share 48 of "0". Corresponding to this, in the T-side set are "C" as the vendor name 41 and the product name 42, "63521" as the S/N 43, "1" as the WWN 44, "1" as the LUN 45, "1" as the identifier 46, "20" as the IOPS 47, and the IV (C1) having the state 49 of, for example, "updating". In the same manner, the V mapping of A2-D1, B1-C2, and B2-D2 is set to have the state of "used" and utilized in the second line, the third line, and the fourth line, respectively. Meanwhile, in the T-side, the TVs of C3 and D3 are set to have the state of "unused". The values of the IOPS 47 are examples, and vary in accordance with IOPS measurement corresponding to the occurrence of data input/output with respect to the corresponding V and the registration to the DB 40.

In FIG. 6, examples of the data input/output access to the IVs and the I/O access from the IVs to the TVs are shown by arrows. The host #A (50) performs access by specifying A1 so as to utilize A1. In regard to the access to A1 serving as an IV, if it has been mapped with a TV, the IS #A (10) accesses the R 30 by specifying A1 and WWN5. The R 30 checks the association of A1 and C1 by referencing the V mapping information in the DB 40, and accesses the TS #C (20) by specifying C1 and WWN1. In response to the access specifying C1, the TS #C (20) associates C1 with an actual V so as to perform a data input/output process with respect to the actual V, and returns the response to the R 30 side. The R 30 returns the response to the IS #A (10), and the IS #A (10) returns the response to the host #A (50).

Also, in FIG. 6, between the IVs and the TVs, a shared LU can be set and utilized as shown by dotted lines. For example, corresponding to the table of FIG. 5B, among A2, B2 and C3, C3 can be set in the state in which it is V-mapped as a LU shared by the two ISs #A and #B (10). For example, in the first and the second lines of FIG. 5B, the setting of the V mapping of C3 serving as a shared LU is shown. In the I side, regarding above described A2, "5" is set as the WWN 44 and "1" is set as the share 48; and, regarding above described B2, "6" is set as the WWN 44 and "1" is set as the share 48. Corresponding to this, in the T side, above described C3 is set such that the WWN 44 is "2" and the state 49 is "used".

Furthermore, in FIG. 6, between the IVs and the TVs, as shown by dotted lines, a plurality of TVs can be set for one IV serving as a shared ID and utilized. For example, corresponding to the table of FIG. 5B, among B1, D1, and D2, B1 can be set in the state in which it is V-mapped as a shared ID. For example, in the third and the fourth lines of FIG. 5B, the V mapping of B1 serving as a shared ID is shown. In the I side, regarding above described B1, "6" is set as the WWN 44 and "0" is set as the share 48. Corresponding to this, in the T side, above described D1 is set to have the WWN 44 of "3" and the state 49 of "used", and above described D2 is set to have the WWN 44 of "4" and the state 49 of "used".

<Control and Processes>

Next, the control and the processes in setting of the V configuration and utilization of the set Vs in the present storage system will be described. In the present system, the processes according to the present configuration management method are performed by executing programs in the R 30 and the storage devices. The R 30 executes a program for configuration management of the entire storage system by the exclusive control unit 34, and performs processes, with the devices connected via the ports 31, for configuration setting with respect to the DB 40. Each of the storage devices executes a programs, at e.g., the CHA 11, for V configuration setting of the own device with respect to the DB 40 of the R 30, and communicates with the R 30 via ports, thereby performing V configuration setting of the device.

The exclusive control unit 34 of the R 30 performs the exclusive control processes in the setting of the V configuration with respect to the DB 40. The present exclusive control is the control for exclusively performing a setting process such that consistency of the setting in the system can be ensured in setting of configuration information with respect to the DB 40 for utilization of the Vs, for example, in V mapping performed by one or more I(s) of, e.g., the ISs 10 with respect to a TV of a TS 20. In the above described setting, in regard to change of the configuration information of the target V in the DB 40, the exclusive control unit 34 causes the setting update of the device which accessed first to be performed by controlling the update lock of the corresponding information in the DB 40. And the exclusive control unit 34 prohibits simultaneous setting update performed by another device(s), such that the setting is not simultaneously updated by a plurality of devices such as the ISs 10.

In the present configuration, for example, when a LU 71 of the TS #C (20) is to be utilized by setting it as a shared LU of the ISs #A and #B (10), the exclusive control in the processes of registration and change of the V configuration for the setting is executed through the processes of the exclusive control unit 34 of the R 30. For example, setting is performed from the M 60 of the IS #A (10) side, the configuration information 80A of the IS #A (10) is updated, and a command for the setting is transmitted from the IS #A (10) to the R 30 via ports. The R 30 receives the command, executes exclusive control relating to the setting of the target LU 71, and updates the configuration information in the DB 40. In the same manner, the configuration information 80B is updated from the IS #B (10) side, and the configuration information in the DB 40 of the R 30 is also updated. Such exclusive control processes of the target Vs can be processed at the transfer rate of the FC-I/F via the ports. Therefore, the processes can be performed quickly without the above described limitation due to the LAN 99.

<Communications>

Figure 7:
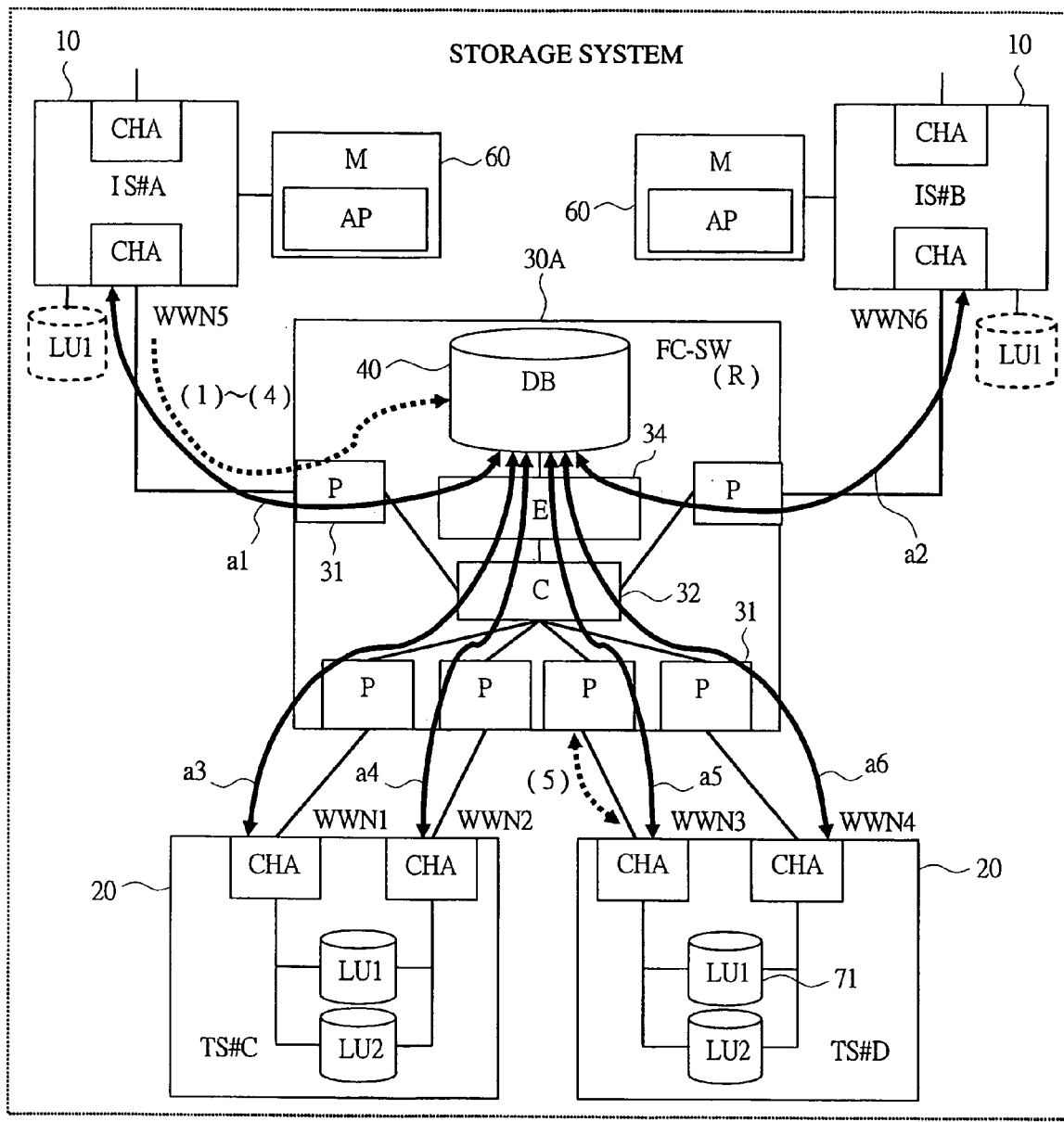
FIG. 7 is an explanatory diagram showing aspects of the communications which can be executed among the devices, in the storage system of the first embodiment of the present invention.

FIG. 7 is an explanatory diagram showing aspects of the communications which can be executed among the devices in the present storage system. The presupposed system configuration is same as that of above described FIG. 1. The devices {10 and 20} connected to the R 30 can perform communications relating to setting and utilization of the V configuration with respect to the R 30 via ports. For example, registration/referencing/deletion of the V configuration or V mapping can be performed as the setting of the V configuration. Each of operations (1) to (4) can be independently executed, for example, from the IS #A (10) to the R 30. In addition, an operation (5) can be executed between the R 30 and a device connected to the R 30 such as a TS 20.

As the operation (1), an update notification of data (configuration information 80), that is, inquiry for checking whether or not information registration can be performed on the R 30 can be executed as a first step for setting, such as registration and update, of the V configuration information with respect to the DB 40. For example, in accordance with setting update performed from the SVP 60, the CHA 11 of the IS #A (10) transmits, via a port, configuration update notification information to the R 30. The R 30 receives the update notification information via the port 31, and checks the state of exclusive control by the exclusive control unit 34 so as to return a response.

As the operation (2), registration of the information of the IV-set in the IS 10 and the information of IV-TV V-mapping can be -executed. For example, the IS #A (10) registers, to the DB 40 of the R 30, a series of information such as that of the S/N of the IS, the LUN of the IV, the LUN of a TV, and the LDEV number, the state information "used" representing that it has been V-mapped, and the utilization type information representing the state of share. For example, after it is confirmed in the step of the operation (1) that registration can be performed, the step of the operation (3) is executed, and registration is performed. The CHA 11 of the IS #A (10) transmits configuration information to the R 30 via the port. The R 30 receives the configuration information via the port 31, and updates the configuration information in the DB 40 while executing exclusive control of the target V by the exclusive control unit 34.

As the operation (3), the IOPS information can be notified from an IS 10. According to the present notification, for example, the IOPS value measured at a port of a CHA 11 of the IS 10 is notified, and the R 30 registers the value of the IOPS 47 in the table in the DB 40. The IS 10 is provided with a function for measuring, for example, the input/output processing performance or the load state in the ports, the processor, etc. of the IS. Also, the IOPS information may be notified from, for example, the IS 10 or the TS 20, or the R 30 side may acquire the information by requesting it to the IS 10 etc. Each of the devices is capable of recognizing the input/output performance or the load state of the access to the TVs, by referencing the IOPS information in the DB 40.

As the operation (4), notification of the state information representing that data is being input/output (updated) with respect to a V can be executed. For example, the IS 10 notifies the R 30 of the state information representing that data is being written ("updating") in the R 30 in regard to the TV of which V-mapping has already been set. And the R 30 updates the information of the corresponding state 49 in the table in the DB 40. The R 30 executes exclusive control of the TV according to the state information. That is, if, during a TV of being subjected to "updating" by a device, another device(s) accesses the R 30 for performing setting of or for utilizing the TV, the R 30 rejects the access.

As the operation (5), a TS 20 can acquire the configuration information in the DB 40 by accessing the R 30 via a port. For example, when the external TS #D (20) is newly connected to the R 30 in the system, the connected TS #D (20) transmits a configuration information acquisition request to the R 30 via a port of a CHA 21. When the R 30 receives the request from the TS #D (20), the R 30 transmits, as a response, the information including the configuration information of the interior of the storage system retained in the DB 40, that is, the configuration information #A to #C. The TS #D (20) receives the configuration information from the R 30, thereby becoming capable of being informed about the entirety or part of the V configuration, etc. in the storage system to which the own TS is connected <DB Information Search>

Figure 8:
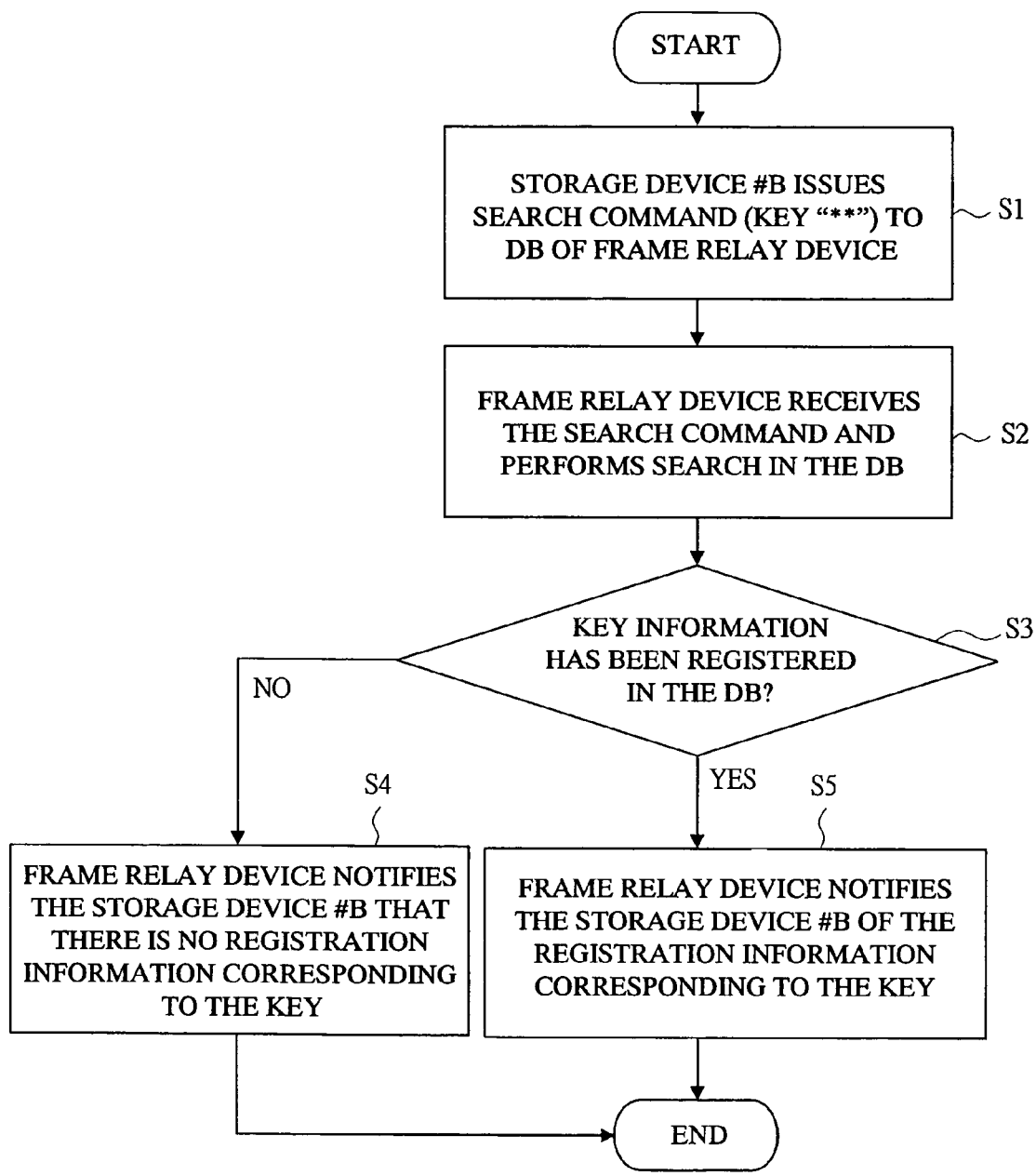
FIG. 8 is a flow diagram showing a process performed when a storage device searches information in the DB of the R, in the storage system of the first embodiment of the present invention.

FIG. 8 is a flow diagram showing a process performed when a storage device, for example, the IS #B (10) searches information in the DB 40 of the R 30. By virtue of the present search function, each of the devices is capable of, for example, perceiving the V mapping state of the interior of the storage system by checking it in the DB 40.

First, in a step S1, the S #B (10) issues, with respect to the DB 40 of the R 30, a search command for checking the V configuration information. The IS #B (10) transmits the search command including a search key "**" to the R 30 via a port of the CHA 11.

Subsequently, in a step S2, the R 30 performs search in the DB 40 according to the information of the search key of the received search command. Subsequently, in a step S 3, if the information corresponding to the search key has not been registered in the DB 40 (S3-NO), in a step S4, the R 30 notifies the IS #B (10) of the information indicating that there is no registration information corresponding to the search key. Meanwhile, if the information corresponding to the search key has been registered in the DB 40 (S3-YES), in S5, the R 30 notifies the IS #B (10) of the registration information corresponding to the search key.

<DB Information Registration>

Figure 9:
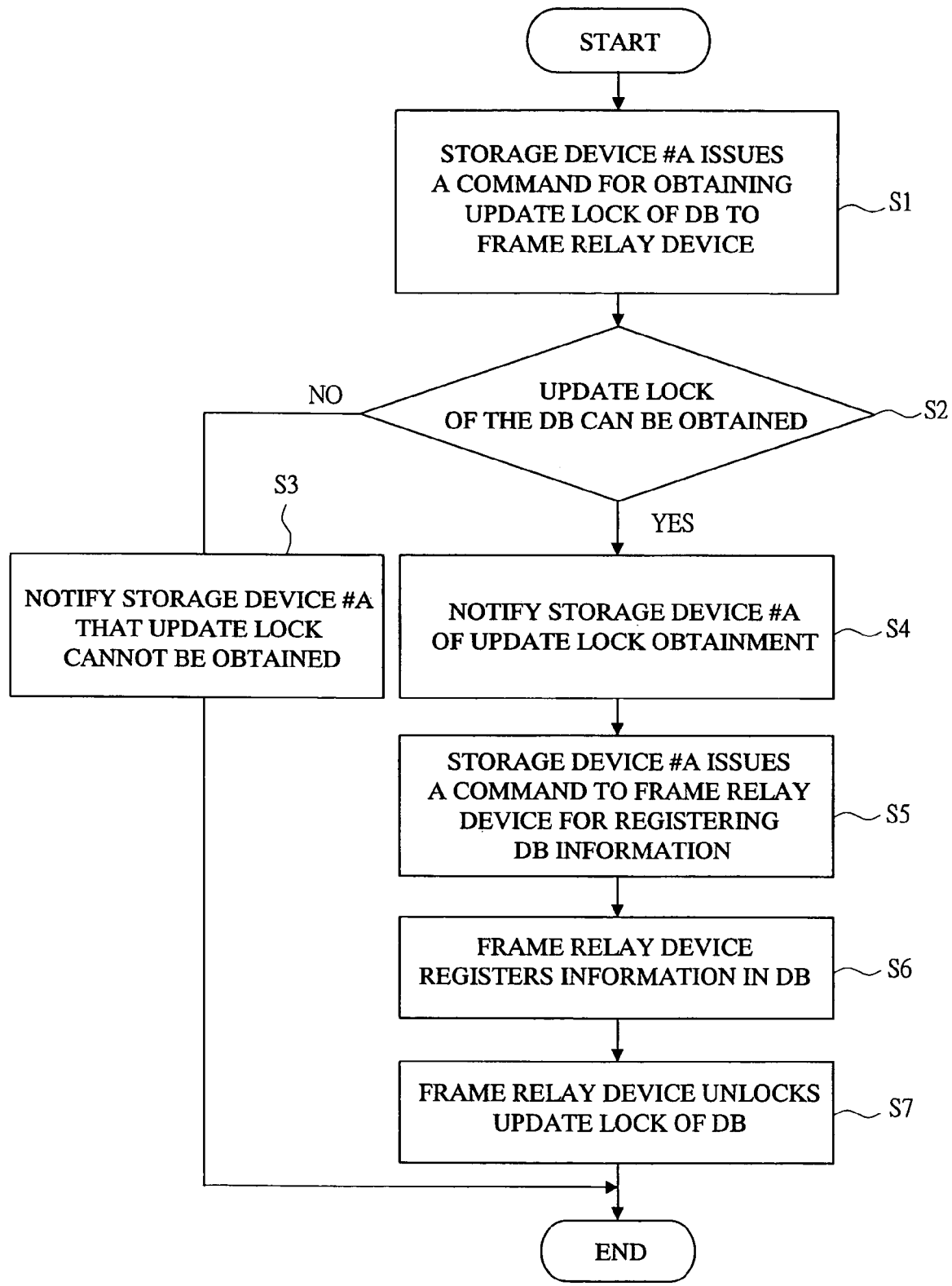
FIG. 9 is a flow diagram showing a process performed when a storage device registers (adds) particular information such as V mapping information with respect to the DB of the R, in the storage system of the first embodiment of the present invention.

FIG. 9 is a flow diagram showing a process performed when a storage device, for example, the IS #A (10) registers (adds) particular information such as V mapping information in or to the DB 40 of the R 30. By virtue of the present registration function, each of the devices can, for example, register V mapping information in the DB 40. For example, control is performed at the IS 10 and the R 30 such that, when the configuration information 80 owned by the IS 10 is updated, the configuration information in the DB 40 of the R 30 is correspondingly updated. In update of the information in the DB 40, the exclusive control unit 34 performs an exclusive control process.

First, in a step S, the IS #A (10) issues a command, with respect to the DB 40 of the R 30, for obtaining an update lock of the information of the DB 40. The command is transmitted to the R 30 via a port of the CHA 11 of the IS #A (10). For example, an update lock process is performed with the entire table serving as the update target. However, the process is performed in the same manner also in the case in which part of the configuration information in the table serves as the target.

Subsequently, in a step S2, in response to the received command from the IS #A (10), the exclusive control unit 34 of the R 30 determines whether or not the update lock of the corresponding table in the DB 40 can be obtained. If the corresponding table is in, for example, an update process performed by another device, the update lock cannot be obtained. If the update lock cannot be obtained (S2-NO), in S3, the R 30 notifies the IS #A (10) that the update lock cannot be obtained, and ends the process. If the update lock can be obtained (S2-YES), in S4, the R 30 obtains the update lock and notifies the IS #A (10) that the update lock has been obtained. Then, in S5, the notified IS #A (10) issues, with respect to the DB 40 of the R 30, a command for registering particular information. The command and the information serving as the registration target are transmitted to the R 30 from the CHA 11 of the IS #A (10). Then, in S6, in accordance with the received command and the information serving as the registration target, the R 30 registers the above described particular information in the table of the DB 40. Then, in S7, after performing the information registration, the R 30 unlocks the update lock of the table of the DB 40, and ends the process.

As a process having the flow opposite to that of the above described one, the R 30 may perform a process of updating the information in the DB 40 when the R 30 accesses, via the port 31, a device connected within the storage system, and detects the configuration of the device so as to acquire the configuration information.

<DB Information Acquisition>

Figure 10:
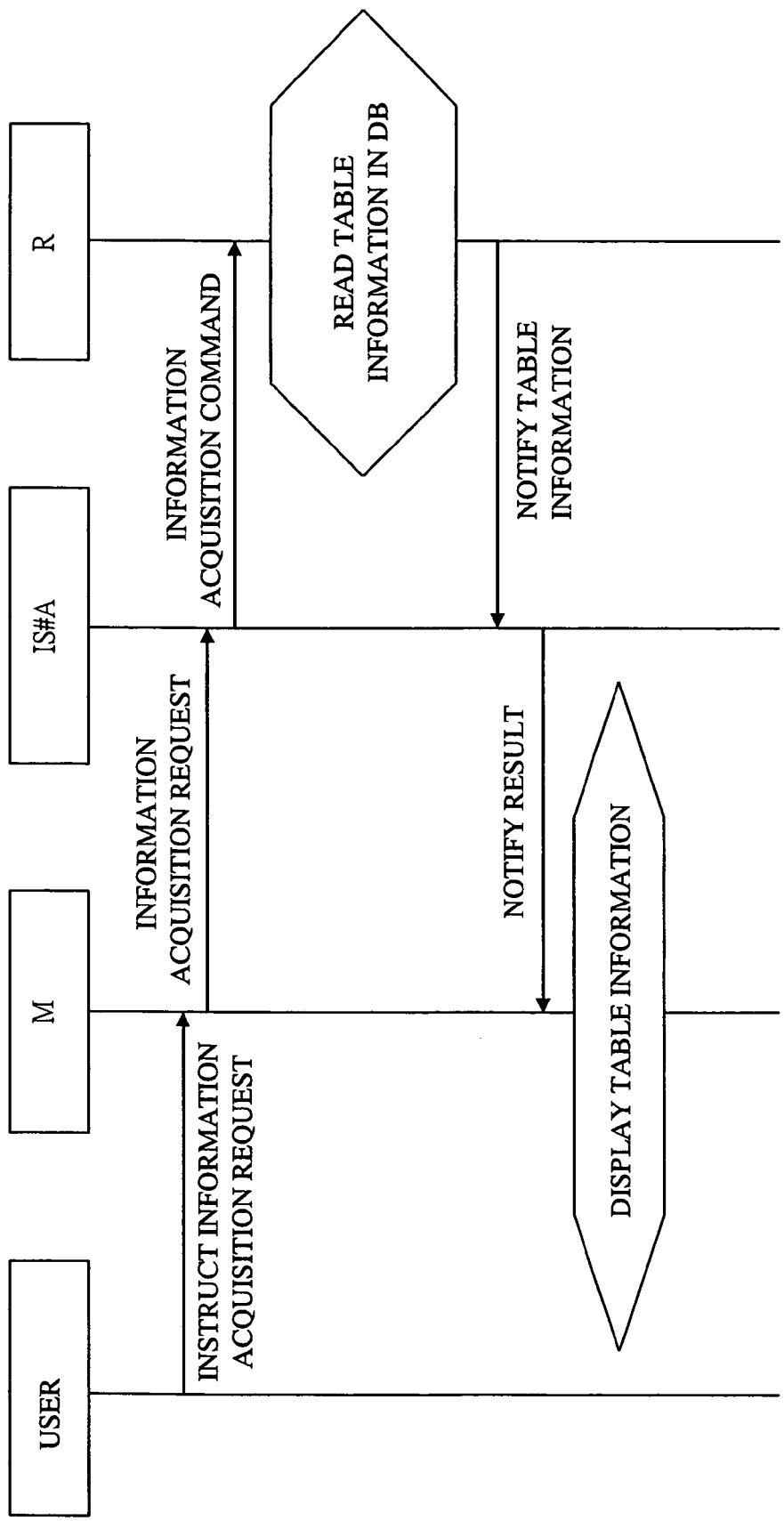
FIG. 10 is a sequence diagram showing the flow of the operation in which a storage device serving as an IS acquires (references) table information from the DB of the R, in the storage system of the first embodiment of the present invention.

FIG. 10 is a sequence diagram of the flow of the operation in which a storage device serving as an IS, for example, the IS #A (10) acquires (references) the table information or configuration information from the DB 40 of the R 30. By virtue of the present acquisition function, each of the devices can check the state of the V configuration of the interior of the storage system so as to perform setting of the V mapping information.

First, a user such as an administrator of the IS #A (10) operates or utilizes the M 60 connected to the IS #A (10), thereby instructing the IS #A (10) to issue a request for acquiring the table information. Accordingly, the information acquisition request issued from the M 60 is transmitted to, for example, the CHA 11 of the IS #A (10). In response to the request from the M 60, the CHA 11 of the IS #A (10) transmits, to the R 30, an information acquisition command serving as a request for acquiring the table information.

When the R 30 receives the information acquisition command from the IS #A (10) via a port, the R 30 reads the table information in the DB 40. Then, as a response, the R 30 notifies the IS #A (10) of the table information requested by the command. When the CHA 11 of the IS #A (10) receives the table information from the R 30, the CHA correspondingly notifies the M 60 of the resultant information. When the M 60 receives the result notification from the IS #A (10), the M 60 displays the resultant table information through GUI in a display screen.

<V Addition>

Figure 11:
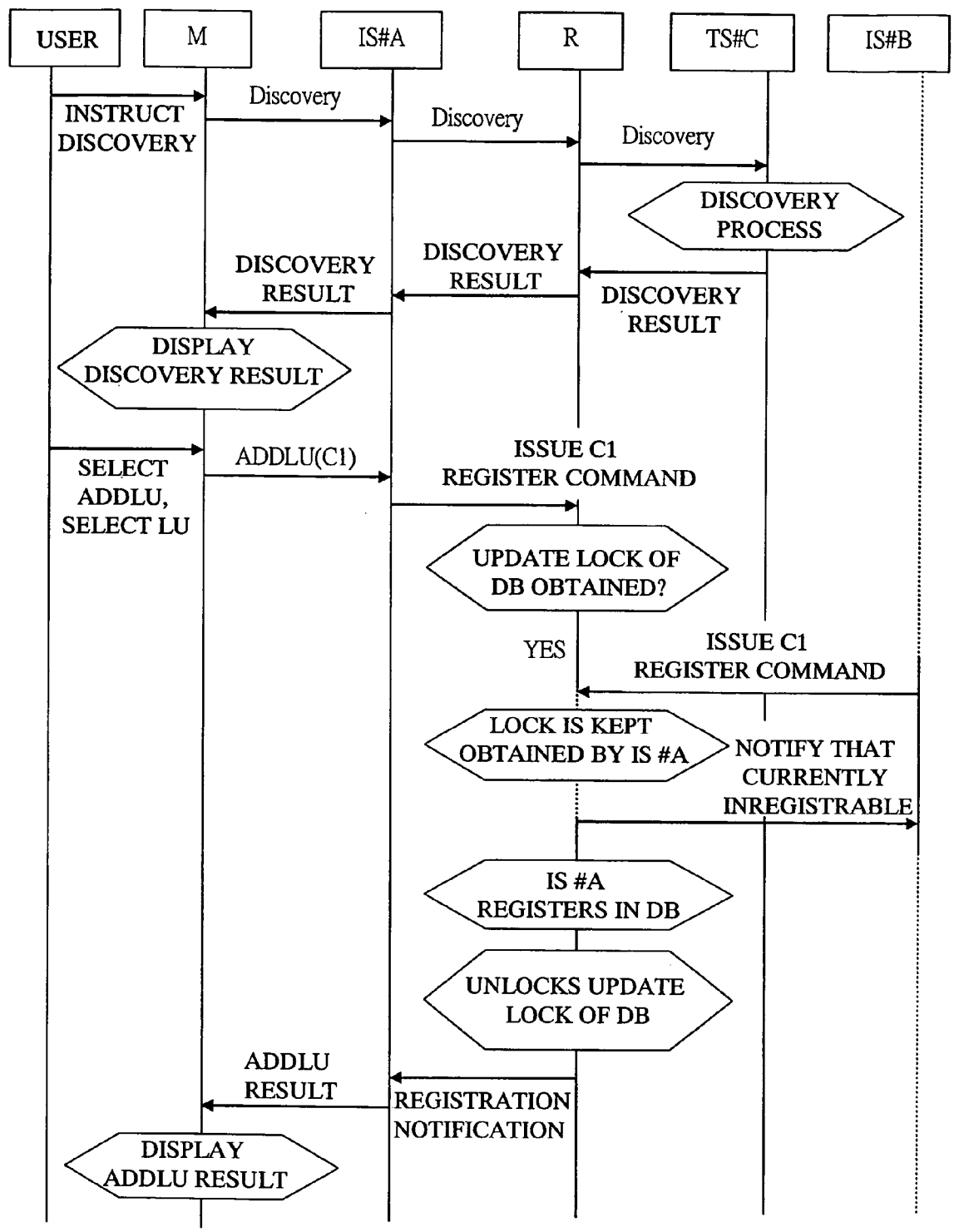
FIG. 11 is a sequence diagram showing the flow of the operation in which a storage device maps a TV of a TS with the IV configuration of the storage device so as to add the TV thereto, in the storage system of the first embodiment of the present invention.

FIG. 11 is a sequence diagram showing the flow of the operation (referred to as V addition) in which a storage device, for example, the IS #A (10) maps a TV (C1) of a TS 20, for example, the TS #C at the outside or in another corporation, with the own IV configuration of the IS so as to add the TV thereto. In update of the information in the DB 40, the exclusive control unit 34 performs the exclusive control process. The present V-addition operation is represented as "ADDLU" in the side of the IS 10 and the M 60. The present example shows the case, as V addition, in which the V mapping information of an IV (e.g., A1) of the IS #A (10) and the target TV (e.g., C1) is registered in the DB 40. At the same time, there shown a case in which the IS #B (10) tries to register the V mapping information of the same target TV (C1) with respect to an IV (e.g., B1), and fails as a result of the exclusive control.

First, a user such as an administrator of the IS #A (10) operates or utilizes the M 60 connected to the IS #A (10) so as to perform instruction of issuing a "Discovery" command. The present "Discovery" command is the command used by the M 60 for referencing, as configuration information, the available Vs owned by the target storage device, and is different from the command for referencing the information in the DB 40. Furthermore, in addition to the present "Discovery" command, as the commands for referencing the configuration information, the commands according to SCSI standard such as "Inquiry (Standard)", "Inquiry (Page 80)", "Read Capacity", "Report LUN", and "Test Unit Ready" can be issued or utilized.

For example, the "Discovery" command for checking the available TVs owned by the TS #C (20) is issued. The "Discovery" command issued from the M 60 in accordance with an instruction is transmitted to, for example, the CHA 11 of the IS #A (10). The CHA 11 of the IS #A (10) transmits the "Discovery" command to the R 30, and the command is relayed by the R 30 and transmitted to the TS #C (20).

In accordance with the received "Discovery" command, the TS #C (20) performs a process of reading out the own configuration information of the TS, and transmits a "Discovery" result to the R 30 side as a response. As the "Discovery" result, for example, the information of {C1 and C2} which are available in the TS #C (20) is returned. The information of the "Discovery" result is returned to the M 60 via the R 30 and the IS #A (10), and displayed in the screen of the M 60. The user sees the information of the "Discovery" result at the M 60, selects, from the available TVs, the TV (e.g., C1) to be added by V-mapping it with the IV configuration of the IS #A (10). And the user instructs, issue of "ADDLU" for V addition and the target LU (C1) thereof. According to the instruction, an "ADDLU" command including specification of the target LU (C1) is transmitted from the M 60 to, for example, the CHA 11 of the IS #A (10). Corresponding to this, the CHA 11 of the IS #A (10) issues, to the R 30, a command (assumed as a register command) for registering in the DB 40 the V configuration information of the target LU (C1).

The R 30 receives the register command from the IS #A (10), executes the exclusive control process according to above described FIG. 9, and performs the process of registering the V configuration information in the DB 40. That is, in accordance with the reception of the register command, first, the R 30 determines whether the above described update lock for registering information in the corresponding table in the DB 40 can be obtained. And if the update lock is obtained (YES), the R 30 notifies the IS #A (10) of this, and registers the corresponding information in the DB 40. Herein, it is assumed that the IS #A (10) issues the register command shortly before the IS #B (10) does, and V addition is normally performed for the IS #A (10) by means of the exclusive control in the R 30. After registering the information of the IS #A (10) in the DB 40, the R 30 unlocks the update lock, and notifies the IS #A (10) that the information has been registered. When the IS #A (10) receives the notification of registration from the R 30, the IS transmits the "ADDLU" result to the M 60. According to the "ADDLU" result, the M 60 performs GUI display in the screen.

Meanwhile, at the same timing as that of the IS #A (10) side, the IS #B (10) has issued, to the R 30, a register command for addition ("ADDLU") of the V configuration regarding the same TV (C1). The user of the IS #B (10) operates or utilizes the M 60 connected to the IS #B (10) so as to perform instruction of issuing a "Discovery" command. And, in the same flow as the process of the IS #A (10), the user displays the "Discovery" result in the screen of the M 60. The user sees the information of the "Discovery" result at the M 60, selects, from the available TVs, the TV (e.g., C1) to be added to the IV configuration of the IS #B (10), and instructs issue of "ADDLU" command for addition. Corresponding to this, a register command regarding C1 is issued from the IS #B (10) to the R 30.

However, it is assumed that the register command from the IS #B (10) is received in the state in which the update lock has been obtained beforehand in the R 30 by the IS #A (10). The exclusive control unit 34 of the R 30 references the corresponding table information in the DB 40. The R 30 recognizes that the corresponding TV (C1) is, for setting performed by the IS #A (10), kept in the update lock obtained state (corresponding to "updating" state) or in a "used" state. Therefore, the R 30 notifies the IB #B (10), as a response to the register command from the IS #B (10), for example, that the corresponding TV (C1) is currently in the state that registering cannot be performed or caused to be in the "used" state by the IS #A (10). When the IS #B (10) receives the notification from the R 30, the IS transmits the "ADDLU" result indicating failure of V configuration addition to the M 60, and the M 60 displays the information of the "ADDLU" result in the screen through GUI.

In the manner of the above described processes, when a plurality of ISs 10 tries to perform setting at close timing with the same TV serving as the target, the R 30 executes the exclusive control by the processes of the exclusive control unit 34 such that the plurality of devices does not perform setting of or access the same TV.

<Inter-I Communication and Inter-T Communication>

Furthermore, as shown by solid-line arrows in above mentioned FIG. 7, in the present embodiment, communication relating to configuration setting can be performed between the I devices and between the T devices via the DB 40 of the R 30. In the present system, the DB 40 is disposed in the R 30 so as to manage the configuration information of the devices including that of the V configuration, therefore the communication relating to the V configuration is newly realized in I-I and in T-T which could not performed in conventional art. For example, between the ISs #A and #B (10), inter-I communication for, e.g., setting of the V configuration or change thereof can be performed for the setting of the V mapping of IV-TV of various utilization types such as that of a dedicated LU and a shared LU, via the table in the DB 40 of the R 30. Similarly, between the TSs #C and #D (20), inter-T communication for, e.g., setting of the V configuration or change thereof can be performed for the setting of the V mapping of IV-TV of various utilization types via the table in the DB 40 of the R 30.

In the inter-I communication, when each of the plurality of ISs 10 individually accesses the DB 40 of the R 30, the setting of the V configuration can be performed. For example, the IS #A (10) executes, with respect to the DB 40 of the R 30, registration of the V mapping information for setting the TV to be exclusively utilized by the device. On the other hand, when the IS #B (10) references the same table in the DB 40 of the R 30, the IS #B can check the V mapping information determined by the IS #A (10). Accordingly, the IS #B can avoid execution of the setting with respect to the same TV which is in the "used" state, and select setting with respect to another TV in the "unused" state. In the present inter-I communication, the ISs #A and #B (10) are not required to perform synchronous communication in terms of time, and each device may individually access the DB 40 in the R 30. Similarly, also in inter-T communication, when each of the plurality of TSs individually accesses the DB 40 of the R 30, setting of, for example, the V configuration can be performed.

Furthermore, other than the above described inter-I communication and inter-T communication, for example, when the IS #A (10) accesses the R 30 and executes registration of the V configuration, the R 30 may execute, for example, access of notifying the IS #B (10) about that.

The flow of the inter-I communication is, for example, as the following. The IS #A (10) checks available TVs by searching or acquiring the information of the DB 40 from the R 30 in the manner shown in FIG. 8 or FIG. 10, or by issuing the "Discovery" command to the TS 20 in the manner shown in FIG. 11. For example, C1 of the TS #C (20) is, in the available state, and the IS #A (10) executes the operation of V addition for V-mapping a TV (C1) with an IV (e.g., A1) with respect to the R 30 in the manner shown in FIG. 11. On the other hand, the IS #B (10) similarly executes the operation of V addition for utilizing the TV (C1) with respect to the DB 40 of the R 30. As shown in FIG. 11, the registration is performed if the target TV is in the state of being "unused" with respect to another device, and a response indicating that it is not registrable is made if the TV is in the state of being "used" by another device.

<Port Switching>

Figure 12:
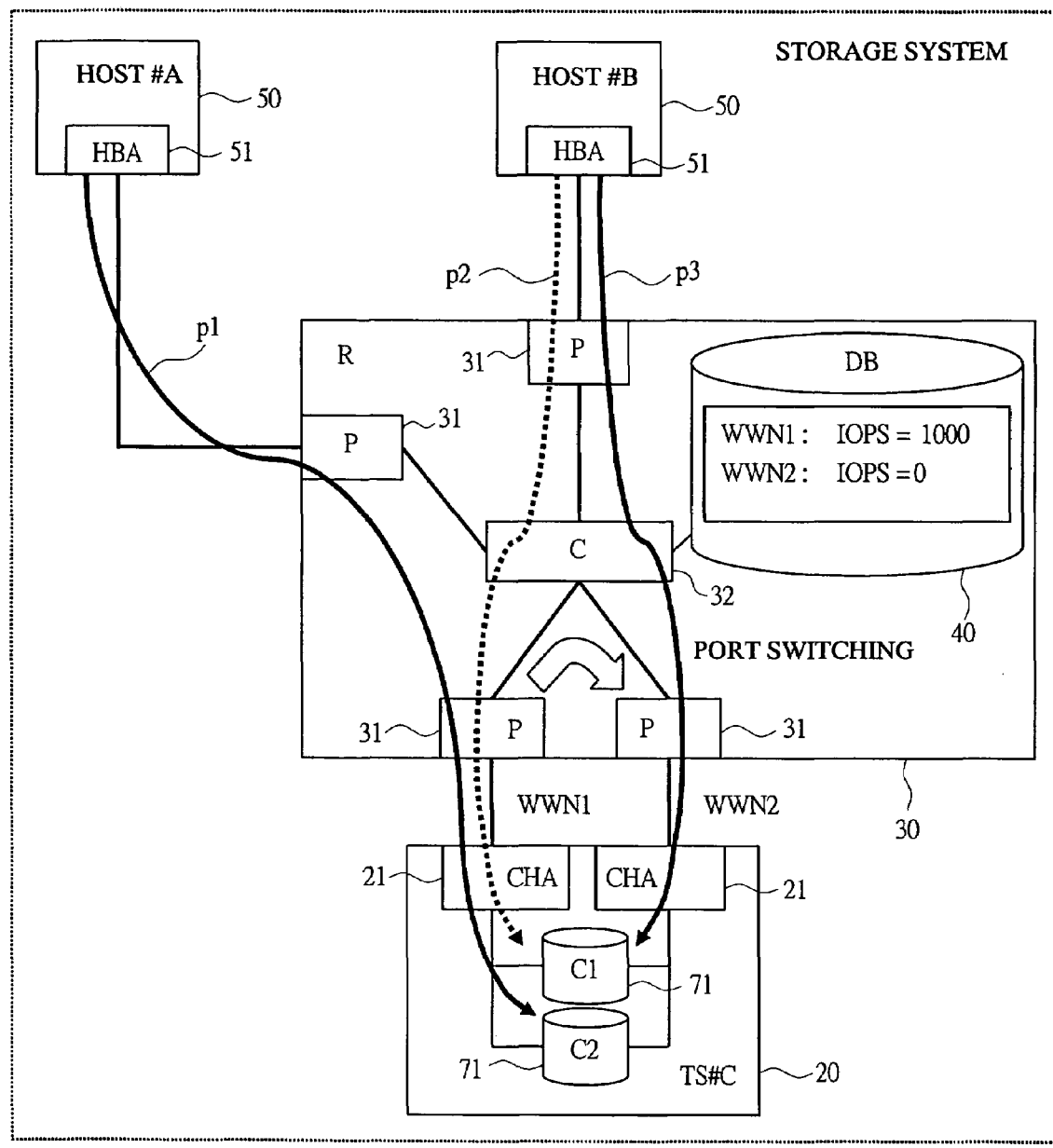
FIG. 12 is an explanatory diagram showing an execution example of a port switching function according to IOPS information in the R 30, in the storage system of the first embodiment of the present invention.

Next, a function applying the V configuration management in the R 30 will be described. FIG. 12 is an explanatory diagram showing an execution example of a port switching function according to the IOPS information in the R 30.

The R 30 manages the information of the IOPS 47 by registering it in the table in the DB 40 whenever needed. By utilizing the IOPS information, the process of switching to an appropriate path or port which has high input/output performance or is in a low-load state can be implemented in the access paths to the TV while centering on the processes in the R 30.

In FIG. 12, the system is in the state in which the flow of data I/O which is performed from the hosts #A and #B (50)

with respect to a TS 20 (TS #C) passes through the ports 31 of the R 30. Herein, although the hosts 50 are connected to the R 30 instead of the ISs 10 in the shown case, the port switching function can be implemented in the same manner also in the case in which data I/O with respect to the TS 20 is performed from the ISs 10 instead of the hosts 50.

In the first state, the host #A (50) is performing access of data I/O (referred to as #1) through a path (p1) to C2 serving as a LU 71 of the TS 20 via the R 30 and the port of WWN1 with respect to the TS 20. Also, in the state, the host #B (50) is performing access of data I/O (referred to as #2) through a path (p2) to C1 serving as a LU 71 of the TS 20 via the R 30 and the port of WWN1 with respect to the TS 20 (shown by a dot-line arrow). At this time, the state of the IOPS 47 in the ports {WWN1, WWN2} between the R 30 and the TS 20 and the paths {p1, p2} corresponding thereto is assumed to be {1000, 0}. That is, the port of WWN2 is in the unused state and the load thereof is low.

For example, the host #B (50) detects that the flow in the path (p2) of the I/O (#2) of the host is not smooth, and issues a command (referred to as an IOPS command) for checking the IOPS through the R 30. The present IOPS command checks the IOPS of the specified port and registers it in the DB 40, and causes the process of returning the checked IOPS information to be performed. The IOPS command issued from the host #B (50) is transmitted to the R 30 and to the TS 20 through the R 30. In response to the received IOPS command, the TS 20 measures the current values of the IOPS of the ports {WWN1, WWN2} to be checked, and notifies the R 30 of the values as a response. The R 30 received the notice from the TS 20 updates the value of the IOPS 47 in the corresponding table in the DB 40 according to the received IOPS information. That is, the IOPS of the port of WWN1 is set to 1000, and the IOPS of the port of WWN2 is set to 0. Also, the checked IOPS information is returned from the R 30 to the host #B (50).

The host #B (50) references the IOPS information checked by the above described IOPS command, or the IOPS section of the table in the DB 40, thereby recognizing that the IOPS value of the port of WWN2 is lower than that of WWN1 and that the load is lower. According to this recognition, the host #B (50) can switch from the I/O (#2) to the TS 20 in the above described path (p2) via the port of WWN1, to I/O (referred to as #3) in a path (p3) corresponding to a low-load port of WWN2. That is, the host #B (50) switches the used port from that of WWN1 to WWN2 so as to perform the access of I/O (#3) in the path (p3). Alternatively, the host #B (50) transmits an instruction, to the R 30, for switching the used port from that of WWN1 to WWN2. And the R 30 switches the port in accordance with the instruction and, corresponding to that, updates the contents of the information in the DB 40.

The above described process is the case in which switching of the ports and the paths is performed under initiative of the host 50. In the same manner as that, switching of the ports and the paths can be executed under the initiative of the R 30. The R 30 perceives the IOPS state in each of the ports 31 in the R 30, and manages it in the DB 40. For example, the R 30 performs, whenever needed, the process of measuring the IOPS of each of the ports 31 so as to reflect it to the DB 40. Alternatively, for example, the R 30 issues an instruction, to each of the devices connected to the ports 31 of the R, for measuring the IOPS in paths and ports, and receives the information of the IOPS values measured in the devices so as to reflect them to the DB 40. The R 30 performs determination for switching the ports and the paths in accordance with the IOPS state in the paths in the DB 40. With respect to the paths and the ports which have low input/output performance or in a high-load state, the R 30 executes switching to other paths and ports.

Second Embodiment

Figure 13:
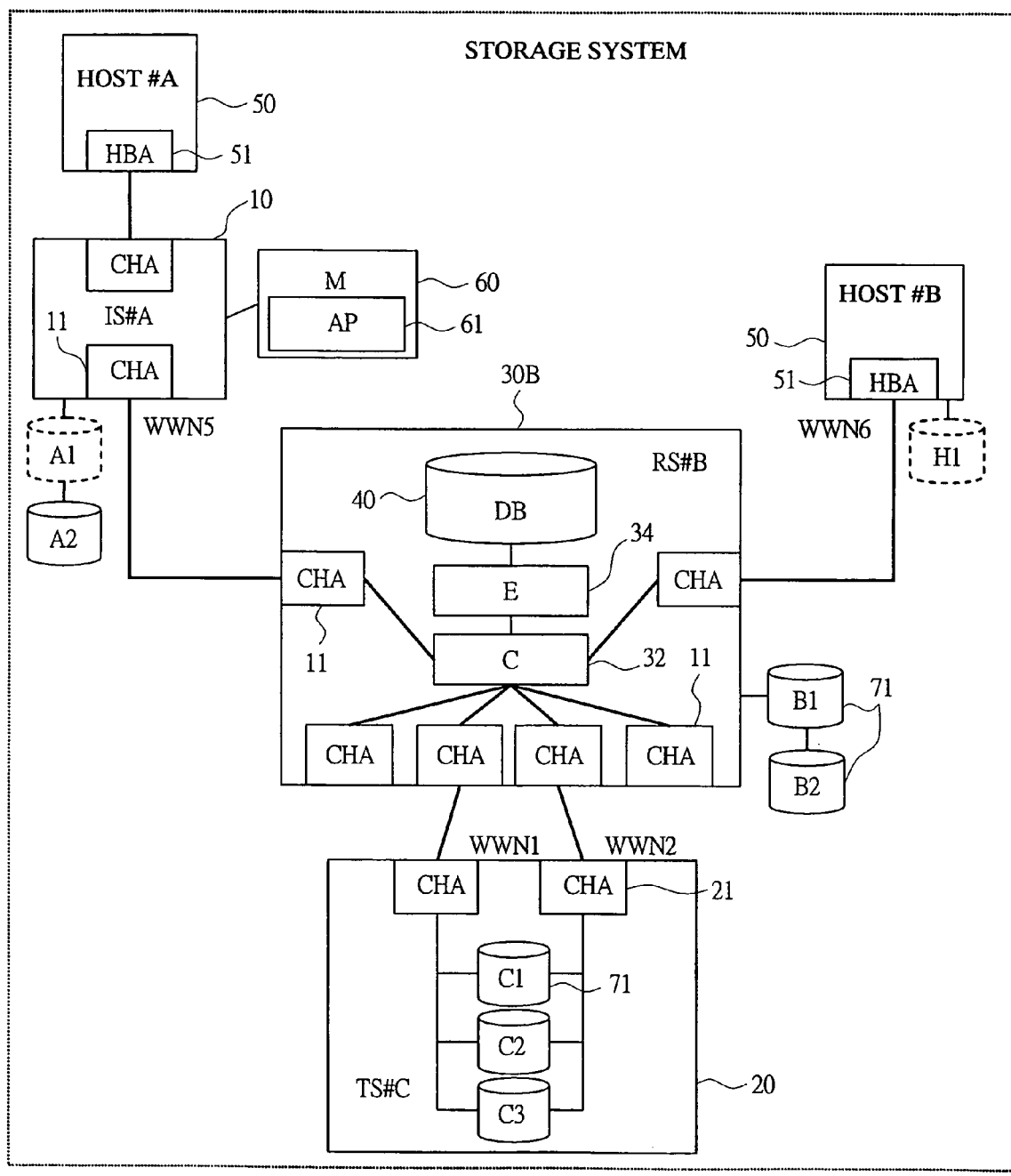
FIG. 13 is a block diagram showing the entire configuration of a storage system of a second embodiment of the present invention.

Next, a storage system of a second embodiment will be described as another embodiment of the present invention. FIG. 13 shows the configuration of the storage system of the second embodiment. In the storage system of the second embodiment, the above described frame relay device (R) 30 is composed of a storage device (RS) 30B provided with a relay function.

In FIG. 13, a RS #B (30B) is provided at the position of the above described R 30. The RS #B (30B) has the configuration of, for example, the above described DKC 100 shown in FIG. 3. The RS #B (30B) implements the functions of the control unit 32 and the exclusive control unit 34 in the DKC 100, and retains the DB 40 in the memories of, for example, the SMs 14. Also, the RS #B (30B) has the CHAs 11 (or port units provided in the CHAs 11) corresponding to the above described ports 31, and accesses the LU(s) 71 owned by the RS via unillustrated DKAs 12.

As an example, the IS #A (10) and the host #B (50) are connected to the RS #B (30B) as I devices, and the TS #C (20) is connected thereto as a T device. The host #A (50) is connected to the IS #A (10). The RS #B (30B) executes the processes according to the configuration management method same as that of the R 30, and manages, in the DB 40, the configuration information of, for example, the V configuration of the devices connected via the ports.

In the present configuration, the host #A (50) accesses and utilizes the IVs of the IS #A (10). Also, the host #B (50) accesses and utilizes the Vs owned by the RS #B (30B). Also, the IS #A (10) accesses and utilizes the Vs which are owned by the RS #B (30B) and serving as TVs. In this case, the RS #B (30B) serves as a T. Also, via relay at the RS #B (30B), the IS #A (10) accesses and utilizes the Vs which are owned by the TS #C (20) and serving as TVs. Also, via relay at the RS #B (30B), the host #B (50) accesses and utilizes the Vs which are owned by the TS #C (20) and serving as TVs. Also, the RS #B (30B) accesses and utilizes the Vs which are owned by the TS #C (20) and serving as TVs. In this case, the RS #B (30B) serves as an I. Also, other than this configuration, it may be configured such that another host 50 is similarly connected to the TS #C (20). Also in this case, the host 50 accesses and utilizes the Vs of the TS #C (20). In the same manner as the first embodiment, the V configuration information of the connection relationships is managed by registering it in the DB 40 of the RS #B (30B).

Third Embodiment

Next, storage systems of a third embodiment of the present invention will be described. FIGS. 14A and 14B show the configuration of the storage systems of the third embodiment. In the storage systems of the third embodiment, a plurality of the above described Rs 30 (or the RSs 30B) are present, and the processes relating to the configuration management are performed between the Rs 30. FIG. 14A shows a first example of the storage system of the case in which the plurality of Rs 30 are connected thereto, and FIG. 14B shows a second example of the storage system of the case in which the plurality of Rs 30 are connected thereto.

The communication for normal data I/O and the communication for the configuration management is performed between the Rs 30 via the ports 31. When V mapping information is registered or updated in the DB 40 of a R 30, by means of the communication between the Rs 30, the V mapping information is subjected to an update reflection process from one side to the other R 30. At this time, in the same manner as the first embodiment, each of the Rs 30 performs the exclusive control process relating to the setting of the V configuration through the process of the exclusive control unit 34. As the communication I/F between the Rs 30, for example, the above described HBA according to the GS-4 standard of the FC standard, and the FDMI defined in the GS-4 standard can be used. The FDMI is partly supported by some of conventional switch devices.

In FIG. 14A, FC-SWs 30A serving as two Rs #A and #B (30) are connected with each other. The hosts #A and #B (50) and the TSs #C and #D (20) are connected to the R #A (30). The ISs #A and #B (10) and a TS #E (20) are connected to the R #B (30). Hosts #C and #D (50) are connected to the ISs #A and #B, respectively. For example, the host #A (50) accesses the TVs of the TSs #C and #D (20) as an I. Also, for example, the IS #A (10) accesses the TV(s) of the #D (20) via the communication between the Rs (30). Also, inter-I communication can be performed between, for example, the hosts #A and #B (50) and the ISs #A and #B (10), and inter-T communication can be performed between, for example, the TSs #C, #D, and #E (20).

Each of the Rs #A and #B (30) has the DB 40, and executes the process of reflecting the V mapping information whenever needed between the Rs #A and #B (30) such that the contents thereof are close with each other. The procedure of the V-mapping information reflection process performed between the Rs #A and #B (30) is, for example, as the following. (1) For example, the host #D (50) maps an IV (B1) of the IS #B with a TV (E1) of the TS #E (20). (2) According to the above described V mapping, the table in the DB 40 in the R #B (30) is subjected to an update process. (3) In accordance with the V configuration update, update information for update reflection is transmitted from the R #B (30) to the R #A (30) by means of the communication between the ports 31. (4) The R #A (30) receives the update information from the R #B (30), and reflects it to the table in the DB 40 of the R #A, thereby performing update. In the above described procedure, exclusive control is performed such that the contents of the information are consistent in the DBs 40 of the Rs 30 in the storage system.

In FIG. 14B, two RSs #B and #C (30B) are connected with each other. The IS #A (10) and the host #B (50) are connected to the RS #B (30B). The TSs #D and #E (20) are connected to the RS #C (30B). The host #A (50) is connected to the IS #A (10). For example, the IS #A (10) accesses, as an I, the TVs owned by the RS #B (30B). Also, for example, the RS #C (30B) accesses, as an I, the TVs owned by the TS #E (20). Also, for example, the host #B (50) accesses, as an I, the TVs of the TS #D (20) via the communication between the RSs #B and #C (30B). Also, for example, the RS #B accesses, as an I, the TVs of the RS #C (30B).

Each of the RSs #B and #C (30B) has the DB 40, and, in the same manner as the case of above described FIG. 14A, executes the process of reflecting the V mapping information whenever needed between the RSs 30B such that the contents thereof are close with each other.

<Effects>

As described above, the below described effects are provided according to the present embodiments.

(1) Efficient setting or utilization of the V configuration can be realized, without the limitations due to the transfer rate of the LAN 99, in a low cost configuration which does not require additional equipment such as the LAN 99 and the management server 90, by managing the configuration information including the V configuration in the R(s) 30 which is essential for forming a storage system. Introduction of the storage management program 94 is not required, either. Note that additional configuration having the LAN 99 and the management server 90 may also be employed in combination with the system. Particularly, the R(s) 30 can be used even if failure occurs in, for example, the LAN 99.

(2) Furthermore, the R 30 can quickly process management and utilization of the V configuration, and can also process the exclusive control relating to setting of Vs among a plurality of devices at high speed. Accordingly, the function of, for example, virtualization of storage resources can be provided. Transfer of the configuration information via the R 30(s) can be performed, instead of the conventional transfer of the configuration information through inquiry between storage devices by use of the "Inquiry" command or the like. It should be noted that the above described "Inquiry" command is the command for inquiring about the configuration information performed from a storage device to another storage device. In the mode in which inquiry of the configuration is performed by use of the "Inquiry" command or the like between the devices instead of performing configuration management in the R(s) 30, the contents of the configuration information retained in the devices tend to differ among them. When it is managed in the R(s) 30, the consistency between the logical configuration state retained in the DB(s) 40 and the actual configuration state in the storage system can be immediately achieved. Therefore, the reliability of the entire storage system can be further enhanced. Furthermore, for example, each of the devices connected to the R 30 is capable of referencing and updating the DB 40 in the R 30, and is also capable of acquiring the configuration information of the entire storage system. For example, a device such as a storage device which is in another corporation or is connected externally is capable of perceiving, e.g., the V configuration state of the devices in the system by referencing the DB 40 in the R 30. Furthermore, the R 30 is capable of detecting the configuration of a newly connected device(s) in the storage system via the port(s) 31, and updating the configuration information in the DB 40.

(3) Furthermore, by means of the configuration management at the R(s) 30, the functions of, for example, the communication relating to configuration setting between Is or Ts via the R(s) 30, and switching of paths and ports which is utilizing the management of the IOPS information at the R 30 and according to the input/output performance or the load state of the paths in V access, can be realized, wherein the functions could not realized in conventional techniques.

As described above, the invention accomplished by the present inventors has been described in detail with reference to the embodiments. However, it goes without saying that the present invention is not limited by the above described embodiments, and various modification can be made without deviating from the scope of the invention.

The present invention can be utilized in, for example, a storage-related system or information processing device which requires management of configuration information.

What is claimed is:

1. A storage system, comprising:
    a storage device provided with a memory device and a storage control device for controlling storage of data with respect to the memory device so as to handle it as a storage volume, a frame relay device for relaying communication between a plurality of devices including the storage device; wherein the frame relay device has:

ports for connecting the plurality of devices, a control unit for switching the connection between the ports, a DB for retaining configuration information including a configuration of the storage volumes of the plurality of devices connected to the frame relay device via the ports, and an exclusive control unit for performing an exclusive control process with respect to the configuration information in the DB upon setting for utilizing the storage volume among the plurality of devices, a first storage device serving as an initiator and a second storage device serving as a target which are connected to the frame relay device via the ports; wherein, with respect to the configuration information in the DB of the frame relay device, setting for mapping a first storage volume owned by the first storage device with a second storage volume owned by the second storage device is performed in a form including information of association of IDs thereof and the ports, and, when access from the first storage volume to the second storage volume is to be performed between the devices connected to the frame relay device, relay is performed at the frame relay device in accordance with the configuration information in the DB, wherein, in accordance with reception of a command from the first storage device, the frame relay device performs setting including mapping of the first and the second storage volumes with respect to the configuration information in the DB, and, upon the setting including mapping, the exclusive control unit obtains an update lock of the configuration information in the DB, wherein, if the second storage volume specified by the command is in an unused state, the exclusive control unit performs a process of updating the configuration information in the DB and unlocking the update lock, and, if the second storage volume is in a used state, the exclusive control unit performs a process of rejecting update of the configuration information in the DB.

2. The storage system according to claim 1, wherein the setting with respect to the configuration information in the DB includes the information of the association of an ID of the first storage device and an ID of the first storage volume in the device, an ID of the second storage device and an ID of the second storage volume in the device, an ID of a port used between the first storage device and the frame relay device, and an ID of a port used between the second storage device and the frame relay device.

3. The storage system according to claim 1, wherein, with respect to the first storage device, setting of configuration information including mapping of the first and the second storage volumes is performed, in accordance with the setting of configuration information including mapping, the first storage device transmits a command for registering configuration information, which is corresponding to the setting, to the frame relay device, and, in accordance with reception of the command for registration from the first storage device, the frame relay device performs an updating process by registering the configuration information in the DB.

4. The storage system according to claim 1, wherein a device connected to the frame relay device via a port performs a process of acquiring the configuration information in the DB by accessing the frame relay device.

5. The storage system according to claim 1, wherein, among the plurality of devices connected to the frame relay device, each of the devices serving as an initator or each of the devices serving as a target individually accesses the configuration information in the DB of the frame relay device so as to perform communication relating to setting of the configuration of the storage volume.

6. The storage system according to claim 1, wherein the frame relay device performs a process of acquiring information representing input/output performance in paths of access to the second storage device connected to the frame relay device via a port and of registering the information in the DB, and, based on comparison of the information representing the input/output performance, a process of switching from the port used in the paths of access to the second storage volume to another port of which information representing the input/output performance has a lower value.

* * * * *